(12) United States Patent
Agarwal et al.

(10) Patent No.: US 11,750,489 B1
(45) Date of Patent: Sep. 5, 2023

(54) MODIFYING HEALTH MONITORING THROUGH USER INTERFACE

(71) Applicant: VMware, Inc., Palo Alto, CA (US)

(72) Inventors: Minjal Agarwal, Santa Clara, CA (US); Vinith Podduturi, Fremont, CA (US); Tejas Sanjeev Panse, San Jose, CA (US); Sonam Sinha, San Jose, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 17/875,360

(22) Filed: Jul. 27, 2022

(51) Int. Cl.
*H04L 43/0817* (2022.01)
*H04L 43/045* (2022.01)
*H04L 43/16* (2022.01)

(52) U.S. Cl.
CPC ........ *H04L 43/0817* (2013.01); *H04L 43/045* (2013.01); *H04L 43/16* (2013.01)

(58) Field of Classification Search
CPC ............................ H04L 43/0817; H04L 43/16
See application file for complete search history.

(56) References Cited

U.S. PATENT DOCUMENTS

| | | | | |
|---|---|---|---|---|
| 9,787,709 | B2 * | 10/2017 | Doubleday | G06F 8/65 |
| 10,230,601 | B1 * | 3/2019 | Qin | H04L 43/08 |
| 11,005,721 | B1 | 5/2021 | Patki et al. | |
| 2020/0007405 | A1 | 1/2020 | Chitalia et al. | |
| 2022/0006701 | A1 | 1/2022 | Patel et al. | |

OTHER PUBLICATIONS

Non-Published Commonly Owned Related U.S. Appl. No. 17/875,344 with similar specification, filed Jul. 27, 2022, 72 pages, VMware, Inc.
Non-Published Commonly Owned Related U.S. Appl. No. 17/875,352 with similar specification, filed Jul. 27, 2022, 71 pages, VMware, Inc.
Non-Published Commonly Owned Related U.S. Appl. No. 17/875,356 with similar specification, filed Jul. 27, 2022, 71 pages, VMware, Inc.

* cited by examiner

*Primary Examiner* — Anh Nguyen
(74) *Attorney, Agent, or Firm* — ADELI LLP

(57) ABSTRACT

Some embodiments provide a novel method for monitoring health of an SMN that includes multiple networking components. A health analytics manager identifies a set of one or more metrics associated with the network components of the SMN. The health analytics manager uses the set of metrics to compute a first health score for the SMN. Then, the health analytics manager presents the first health score in a UI along with (1) data regarding how the first health score was computed, and (2) a set of one or more parameters for a user to modify how the health for the SMN is computed. After receiving from the user one or more modifications to at least one of the parameters, the health analytics manager computes a second health score for the SMN based on the modified set of parameters.

18 Claims, 25 Drawing Sheets

MODIFYING HEALTH MONITORING THROUGH USER INTERFACE

BACKGROUND

It is important for users to have full visibility into the health of components in order to proactively monitor and take actions in advance to avoid costly outages. Health of composite components depends upon various factors and each of these factors are currently monitored independently. However, users have to manually monitor all of these factors and co-relate them in order to determine the overall health of the composite component, which is time consuming and requires strong expertise in the component's architecture and how it impacts networking, performance, and latency, in general, to accurately detect a health issue. New methods and systems are needed to automatically quantify the health of composite components, control planes and data planes of networks, distributed network elements, and logical networks.

BRIEF SUMMARY

Some embodiments provide a novel method of assessing health of a software managed network (SMN) that includes multiple forwarding elements that exchange data messages with each other. A health analytics manager collects performance metrics from control-plane components of the SMN that configure the forwarding elements of the SMN to forward data messages. The health analytics manager also collects performance metrics from data-plane components including the forwarding elements of the SMN. Then, the health analytics manager generates one health score from the collected performance metrics of the control-plane and data-plane components to express an overall health of the SMN.

In some embodiments, the forwarding elements of the SMN included in the data-plane components are physical forwarding elements (PFEs) of the SMN that are configured to implement a set of one or more logical forwarding elements (LFEs) that exchange data messages with each other. In other embodiments, the forwarding elements of the SMN included in the data-plane components are the LFEs implemented by PFEs.

The control-plane components of some embodiments includes (1) a central control plane (CCP) that includes a set of controllers executing on a host computer in the SMN, and (2) a set of local control-plane (LCP) modules each executing on another host computer in the SMN. In such embodiments, the CCP and the set of LCP modules implement a control plane through which PFEs are configured to implement LFEs and exchange data messages with each other. In some embodiments, the PFEs implement a data plane through which they exchange data messages with each other.

In some embodiments, the performance metrics from the control-plane components include (1) metrics associated with the CCP, (2) metrics associated with the host computer on which the CCP operates, (3) metrics associated with each of the LCP modules, and (4) metrics associated with each host computer on which the LCP modules operate. The performance metrics of the data-plane components in some embodiments includes metrics associated with the data messages exchanged between the forwarding elements of the SMN, i.e., LFEs, PFEs, or both.

In some embodiments, the health analytics manager also collects performance metrics from management-plane components of the SMN that manage the control-plane components. In such embodiments, the health analytics manager generates the health score from the collected performance metrics of the control-plane components, the data-plane components, and the management-plane components to express the overall health of the SMN. The management-plane components may include (1) a set of management servers operating on a host computer in the SMN, and (2) local management-plane (LMP) modules each operating on other host computers in the SMN. The performance metrics of the management-plane components, hence, may include metrics associated with the set of management servers and the LMP modules. The management servers manage the control-plane components of the SMN by receiving data from users/administrators for the SMN, and providing the data to the control-plane components. In some embodiments, the management servers process the data before providing it to the control-plane components. In other embodiments, the management servers provide the data to the control-plane components as it is given to the management servers. The management servers also in some embodiments receive data from PFEs and/or LFEs of the SMN, such as topology data, and the management servers use this data to configure the control-plane components.

The health score generated to express the overall health of the SMN is in some embodiments a final health score computed based on secondary health scores. To generate the aggregated health score, the health analytics manager computes a first health score from the collected performance metrics of the control-plane components to express a health of the control-plane components. The health analytics manager also computes a second health score from the collected performance metrics of the data-plane components to express a health of the data-plane components. Then, the health analytics manager uses the first and second health scores and weight values assigned to the control-plane components and the data-plane components to generate the final health score to express the overall health of the SMN.

In some embodiments, control-plane components are as a group assigned one weight and the data-plane components are as a group assigned one weight, such that the health analytics manager computes the first health score for the control-plane components and the second health score for the data-plane components, and uses the assigned weights to combine the two health scores. In other embodiments, the metrics of the control-plane components and the data-plane components are each assigned their own weight. In such embodiments, a normalized metric value is computed for each metric, and the normalized metric values are used along with individual weights assigned to the metrics to compute the final health score. In both of these two methods of generating the final health score, the weights may be assigned by an administrator or a user.

As discussed previously, the health analytics manager in some embodiments generates one health score using the performance metrics of the control-plane, data-plane, and management-plane components (if the management-plane components metrics are collected) to express the overall health of the SMN. In other embodiments, the health analytics manager generates a health score for each component type. For instance, the health analytics manager generates a first health score from the collected performance metrics of the control-plane components to express an overall health of the control plane of the SMN, and generates a second health score from the collected performance metrics of the data-plane components to express an overall health of the data plane of the SMN. If performance metrics from management-plane components are collected, the health analytics manager may also generate a third health score from the collected performance metrics of the management-plane components to express an overall health of the management plane of the SMN. In such embodiments, the three health scores are computed in order to monitor the health of the control, data, and management planes individually to understand which plane, if any, is causing a poor health of the SMN.

Some embodiments provide a novel method for monitoring the health of LFEs of a logical network. For an LFE implemented by multiple PFEs, a health analytics manager identifies a set of one or more metrics associated with each PFE implementing the LFE. The health analytics manager uses the set of metrics to compute a health score for the LFE. Then, the health analytics manager provides the health score in a report to provide an indication regarding the monitored health of the LFE. The set of metrics used to compute the health score for the LFE includes, in some embodiments, at least one metric for each PFE implementing the LFE.

In some embodiments, to compute the health score using the set of metrics, the health analytics manager computes a normalized metric value for each metric in the metric set. the normalized metric values may be computed by dividing the collected metric value by the metric's maximum value. The normalized metric values may instead be computed based on rules and/or thresholds defined by an administrator or user. For example, for a storage usage metric for a particular network element, a rule may be defined such that when the storage usage reaches 60%, the normalized metric value for the metric is a value of 50 (in embodiments where normalized metric values are valued on a 1 to 100 scale). Another rule may be defined for this metric such that when the storage usage reaches 90%, the normalized metric value drops to a value of 10. Any suitable threshold or rule may be defined for any metric.

Once the normalized metric values for each metric are computed, the health analytics manager computes the health score based on the normalized metric values for each of the metrics and based on weights assigned to the metrics. The weights assigned to each metric of some embodiments, when added together, sum to 100% (when the weights are values within a range of 0% to 100%). The weights in other embodiments, when added together, sum to 1 (when the weights are values within a range of 0 to 1). For example, a first metric may have a normalized metric value of 80 and have an assigned weight of 40%, so the weighted normalized metric value for the first metric is 32 (i.e., 40% of 80). A second metric may have a normalized metric value of 60 and have an assigned weight of 60%, so the weighted normalized metric value for the second metric is 36 (i.e., 60% of 60). Once weighted normalized metric values are computed, the health analytics manager computes a sum of the weighted normalized metric values to compute the health score. Using the example above, the health analytics manager would sum the weighted normalized metric values of the first and second metrics (i.e., 32 and 36), resulting in a health score of 68.

In some embodiments, the health analytics manager computes one or more secondary health scores for groups of metrics, before computing the final health score for the LFE. For instance, the health analytics manager computes a secondary health score based on a subset of normalized metric values for a subset of the set of metrics and weights assigned to those metrics. The subset of metrics may be associated with a particular PFE implementing the LFE, or may be associated with a particular metric type. An administrator or a user may create metric groups using any suitable criteria. After the secondary health scores are computed, the health analytics manager computes the health score for the LFE based on the secondary health scores, normalized metric values for each metric not in any subset of metrics used in computing the secondary health scores, and weights assigned to the secondary health scores and the metrics.

As discussed above, the health score for the LFE is provided in a report to provide an indication regarding the monitored health of the LFE. In some embodiments, the report includes a score tree that includes (1) a mapping of the normalized metric values for each metric, the secondary health scores, and the health score, and (2) each of the weights used by the health analytics manager. For instance, if the set of metrics for the LFE includes 10 metrics, the score tree would include 10 leaves for each metric, and specify each weight assigned to each of the 10 metrics. If there are two metric groups (i.e., if there are two subsets of metrics to compute two secondary health scores before computing the final health score), the score tree would also include two leaves for the two metric groups, and the weights assigned to each group. The score tree would also indicate which metrics in the 10 metrics are included in the two metric groups. Then, the score tree would have a final leaf for the final health score computed for the LFE.

In some embodiments, the report may also include information for the final health score. This information may include, (1) a potential problem associated with the health score, (2) a potential impact the potential problem may have, and (3) a recommended action to improve the health score. For example, for a final health score of 30 out of 100, the report may provide information regarding potential problems that may arise when the health score is this low, the impact on the LFE this potential problem may have, and recommended actions to improve the health of the LFE. A recommended action may include reducing the amount of storage at a particular PFE implementing the LFE, if a storage usage metric for that PFE has a poor health score. This kind of information may also be presented in the report for any other values computed by the health analytics manager, e.g., for any normalized metric values and any secondary health scores.

The report in some embodiments is provided through a text message, an email, and/or a user interface (UI). The report may also be provided through an application programming interface (API). For instance, the report may use a push model to provide the report. The health analytics manager may push the report in an API to another program. Alternatively, the report may use a pull model to provide the report. For example, another program may send an API request to the health analytics manager requesting the report, and the health analytics manager may send an API response providing the report.

In some embodiments, identifying the set of metrics includes the health analytics manager retrieving the set of metrics from a database. The database of some embodiments also stores health scores previously computed for the LFE. Once the health score for the LFE is computed, the health analytics manager stores it in the database along with the previously computed health scores. In some embodiments, the health score for the LFE is computed at a particular time interval. For example, a new health score for the LFE may be computed every five minutes, and each of those health scores are stored in the database. By storing every health score computed for the LFE, the health of the LFE over time can be monitored.

In some embodiments, a high health score of the LFE indicates that the LFE is healthy, and a low health score indicates that the LFE is unhealthy. For example, if the range of a health score is from 1 to 100, an example of good health score is 90, while an example of a poor health score is 15. In some embodiments, if the health score falls below a particular minimum threshold, the health analytics manager sends a notification that the health score for the LFE is below the minimum threshold. For example, if the threshold is 30, and the health analytics manager computes a health score of 10 for the LFE, the health analytics manager sends a notification to an administrator or a user that the LFE's health score is below the threshold and may also notify that the LFE is at risk of a problem, such as an outage or a failure. In other embodiments, health scores may be computed as anomaly scores (also referred to as penalty scores), such that a high score indicates the LFE is unhealthy, and a low score indicates the LFE is healthy. In such embodiments, if the range of an anomaly score is from 1 to 100, an example of a good anomaly score is 10, while an example of a poor anomaly score is 90. In some embodiments, if the anomaly score reaches a particular maximum threshold, the health analytics manager sends a notification that the health score for the LFE is above the maximum threshold. For example, if the threshold is 75, and the health analytics manager computes an anomaly score of 80 for the LFE, the health analytics manager sends a notification to an administrator or a user that the LFE's health score is above the threshold and at risk of a problem. Different embodiments compute only health scores, only anomaly scores, or a combination of health scores and anomaly scores.

Some embodiments provide a novel method for monitoring the health of logical networks. For a logical network including multiple LFEs, a health analytics manager identifies a set of one or more metrics associated with each LFE in the logical network. The health analytics manager uses the set of metrics to compute a health score for the logical network. Then, the health analytics manager provides the health score in a report to provide an indication regarding the monitored health of the logical network. In some embodiments, at least one LFE is implemented by multiple PFEs, and the set of metrics includes metrics associated with each of the PFEs implementing the at least one LFE.

In some embodiments, the LFEs of the logical network include at least one logical switch. In other embodiments, the LFEs may include multiple logical switches and at least one logical router. Still, in other embodiments, the LFEs may include multiple logical routers and at least one logical gateway. Any type of LFE and any number of LFEs may be included in the logical network for which the health score is computed.

As discussed previously, a health score may be computed based on normalized metric values for each of a set of metrics and based on weights assigned to the metrics. In the example of a logical network, the set of metrics may include at least one metric for each LFE in the logical network, and at least one metric for each PFE implementing any of the LFEs. The health analytics manager computes a normalized metric value for each of these metrics, and computes the final health score for the logical network based on weights assigned to the metrics. The health analytics manager may also compute secondary health scores for metric groups, e.g., for a metric group including metrics for a particular LFE and the PFEs that implement it. The health analytics manager may also compute a secondary health score for a metric group that includes metrics for all logical switches in the logical network, or for all logical gateways in the logical network. An administrator may group metrics and compute secondary health scores based on any suitable criteria.

In some embodiments, the report to provide an indication regarding the monitored health of the logical network includes a score tree including a mapping of the normalized metric values, the secondary health scores, and the final health score, specifying each weight assigned to the metrics and the metric groups. The report may also include, for each computed health score, a potential problem associated with the health score, a potential impact the potential problem may have on the logical network, and a recommended action to improve the health score. For example, if the health score for a metric group including metrics for a logical router is poor, the report may indicate that a recommended action is to remove the logical router from the logical network, and reroute all traffic through that logical router to another logical router in the logical network with a better health score.

The logical network in some embodiments includes all LFEs implemented by all PFEs of a physical network, namely, the logical network may be the entire logical network. In other embodiments, the logical network is a first logical sub-network of a larger second logical network. In such embodiments, the health score for the logical sub-network only indicates the health of the LFEs in the logical sub-network, and not any other LFEs in the entire logical network.

Some embodiments provide a novel method for monitoring the health of an SMN that includes multiple networking components. A health analytics manager identifies a set of one or more metrics associated with the network components of the SMN. The health analytics manager uses the set of metrics to compute a first health score for the SMN. Then, the health analytics manager presents the first health score in a UI along with (1) data regarding how the first health score was computed, and (2) a set of one or more parameters for a user to modify how the health for the SMN is computed. After receiving from the user one or more modifications to at least one of the parameters, the health analytics manager computes a second health score for the SMN based on the modified set of parameters.

In some embodiments, using the set of metrics to compute the first health score includes computing a normalized metric value for each metric in the metric set, and computing the first health score based on each normalized metric value for each metric and weights assigned to the metrics. The data presented in the UI in some embodiments includes the first health score and each of the normalized metric values. The data may be presented in the UI as a score tree, a mapping, a list, etc. In some embodiments, the normalized metric values are computed based on rules and/or thresholds defined by the user through the UI, and the data presented in the UI also includes the rules and thresholds. In such embodiments, the set of parameters includes parameters to modify the rules and thresholds used to compute the normalized metric values, and the modifications received include at least one modification to the rules and thresholds. When the health analytics manager receives a modification to the rules and thresholds through the UI, the second health score is computed by (1) computing an updated normalized metric value for each metric based on the modification to the rules and thresholds, (2) computing the second health score based on the updated normalized metric values for each metric and the weights assigned to the metrics, and (3) presenting the updated normalized metric values and the second health score in the UI.

In some embodiments, the data presented in the UI includes the weights assigned to each metric, and the set of parameters includes parameters to modify the weights.

When the modifications to the parameters received from the user includes at least one modification to at least one weight, the health analytics manager computes the second health score based on the normalized metric values for each metric and updated weights, which are based on the modification to the weights. The health analytics manager then presents the normalized metric values for each metric, the updated weights, and the second health score in the UI.

In some embodiments, the modifications to the parameters received from the user include at least one modification to which metrics associated with SMN are included in the metrics, and the second health score is computed by (1) computing the second health score for the SMN based on the at least one modification to which metrics associated with the SMN are included in the set of metrics, and (2) presenting the second health score in the UI. For instance, when the modification to which metrics are included in the set of metrics includes a modification to not include a subset of metrics in the set of metrics, the second health score is computed using only normalized metric values for the rest of the metrics in the set of metrics. For example, the subset of metrics may include metrics associated with a particular network component of the SMN, such that the second health score for the SMN does not take the particular network component into account because it is computed without any metrics associated with it. The subset of metrics may also include metrics of a particular type, such that the second health score for the SMN is computed without taking that particular metric type into account. For example, if the user wants to view the SMN's health without considering disk usage for all network components, the subset of metrics would include all disk usage metrics for the SMN.

In some embodiments, the modification to the set of metrics included in computing the second health score is a modification to add metrics. For instance, if the set of metrics used in computing the first health score is a first set of metrics, the user may use the set of parameters to add a second set of metrics to the first set of metrics to compute the second health score. The second set of metrics may be associated with a particular network component that was added to the SMN after the first health score was computed. For example, if a new LFE is added to the SMN, the second set of metrics is associated with the new LFE. Alternatively, if a new virtual machine (VM) is added to a host computer in the SMN, the second set of metrics is associated with the new VM. Any modification to the set of metrics is suitable for the user to use the set of parameters to modify the metrics used in computing the health score for the SMN.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings, and the Claims is needed. Moreover, the claimed subject matters are not to be limited by the illustrative details in the Summary, Detailed Description, and Drawings.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

Figure 1:
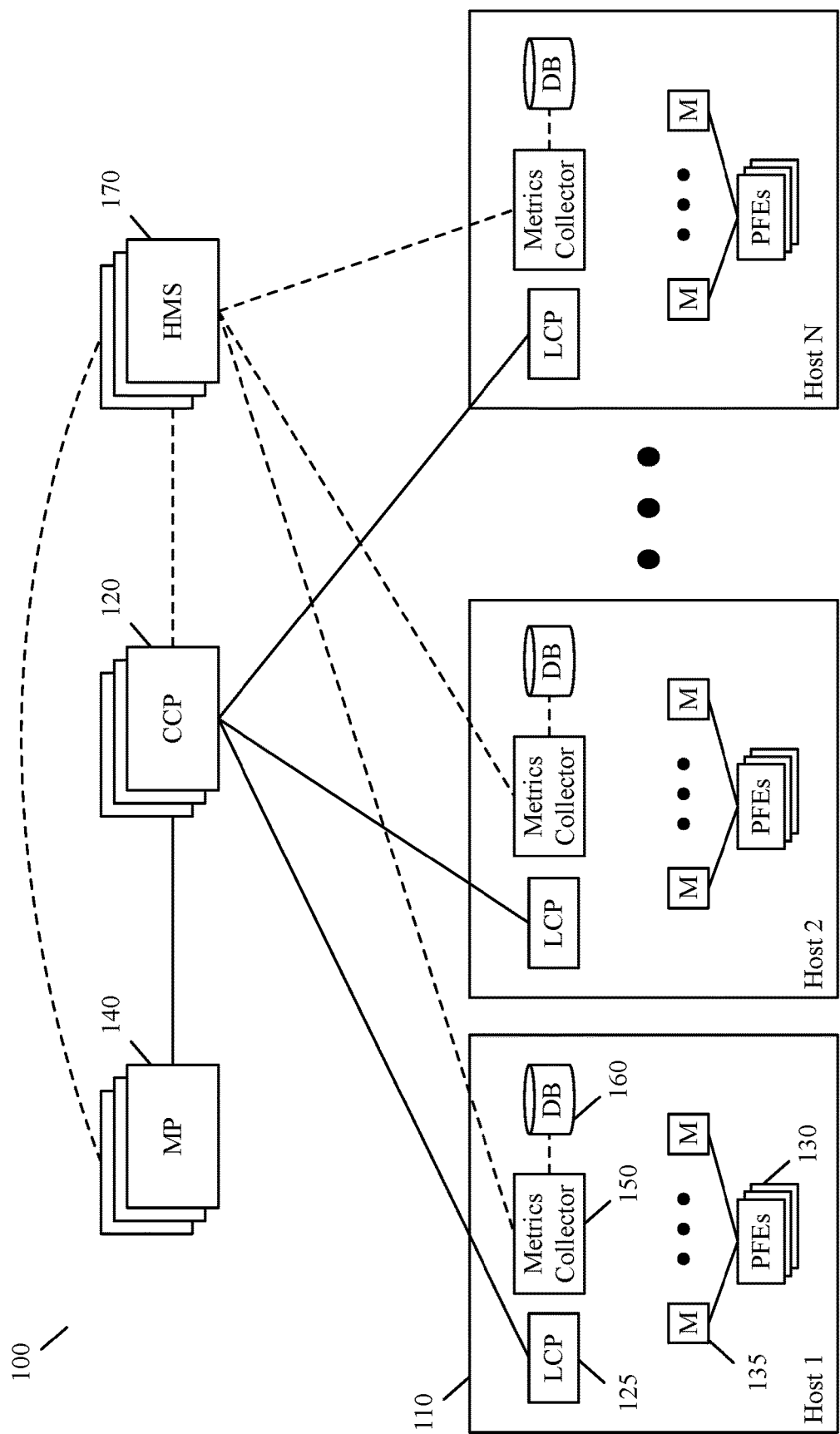
FIG. 1 illustrates an example SMN for which some embodiments of the invention are implemented.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a novel method for computing one health score for a single composite element comprised of several elements to provide an indication of the health of the single composite element. In some embodiments, the health score is computed to quantify the health of an entire software managed network (SMN) deployed in a software-defined datacenter (SDDC). For example, a single health score may be computed for both the control-plane components and the data-plane components of an SMN to express the overall health of the SMN. In other embodiments, one health score is computed for the control-plane components to express the health of the control plane of the SMN, while another health score is computed for the data-plane components to express the health of the data plane of the SMN.

Other embodiments compute one health score quantifying the health for one logical distributed element defined in an SDDC, such as a logical forwarding element (LFE). An SDDC may include logical switches, logical routers, logical gateways, etc., each of which are implemented by one or more physical forwarding elements (PFEs), e.g., software switches, hardware switches, software routers, hardware routers, software gateways, hardware gateways, etc. Different embodiments include one or more of (1) one logical component implemented by one physical component, (2) one logical component implemented by multiple physical components, and (3) multiple logical components implemented by multiple physical components. In some embodiments, one health score is computed for one LFE implemented by multiple PFEs in an SMN.

In some embodiments, for an SMN or an SDDC, one health score is computed to quantify the health of a logical network or a logical sub-network of the SMN or SDDC. For a logical network that includes multiple logical components implemented by multiple physical components, one health score is computed to express the health of all logical and physical components of the logical network. In some embodiments, a health score is computed for all logical and physical components of a logical sub-network that is part of a larger logical network.

Some embodiments, instead of computing health scores, compute anomaly scores (also referred to as penalty scores), which may be values within a range of 1 to 100, with a high anomaly score being a poor score and a low anomaly score being a good score. Any embodiment or process described below may be performed using only health scores, only anomaly scores, or a combination of both health scores and anomaly scores. Any suitable value range of health scores and anomaly scores may be used.

FIG. 1 illustrates an example SMN 100 of an SDDC. The SMN 100 includes hosts 110. Each host 110 includes one or more PFEs 130 and one or more machines 135. The PFEs 130 executing on the hosts 110 are configured to implement a conceptual data plane through which the PFEs 130 exchange data messages with each other. In some embodiments, the PFEs 130 are configured to implement one or more LFEs (not shown), and the data plane is implemented by one LFE or by a set of related LFEs, e.g., by a set of connected logical switches and logical routers. In some embodiments, the SMN 100 has several components (e.g., servers, VMs, host computer modules, etc.) that implement the control plane through which the PFEs 130 are configured to implement a data plane. These control-plane components include a central control plane (CCP) 120 that includes a set of controllers, and local control-plane (LCP) modules 125 operating on the hosts 110. In some embodiments, the SMN 100 also includes one or more standalone PFE devices, such as hardware switches and routers. In such embodiments, an LCP module operates on each standalone PFE device. The CCP 120 of the control plane operates on one host in the SMN 100, and one LCP module operates on each other host computer 110 and hardware PFE 130 in the SMN 100.

The SMN 100 of some embodiments also includes a management plane (MP) implemented by a set of management servers 140. The MP interacts with and receives input data from users, which is relayed to the CCP 120 to configure the PFEs 130. In some embodiments, the MP also receives input data from hosts in the SMN 100 and/or PFEs in the SMN 100, and, based on that input data, manages the control plane. In some embodiments, the management servers 140 process the input data before providing it to the control-plane components 120 and 125. In other embodiments, the management servers 140 provide the input data to the control-plane components 120 and 125 directly as it is given to the management servers 140. The management servers 140 also in some embodiments receive data from PFEs 130 and/or LFEs of the SMN 100, such as topology data, and the management servers 140 use this data to configure the CCP 120. In some embodiments, the hosts 110 also include local management-plane (LMP) modules (not shown). In such embodiments, the management servers 140 communicate with the LMP modules to configure the CCP 120 and the LCP modules 125.

As discussed above, the control plane (i.e., the CCP 120 and the LCP modules 125) configures the PFEs 130 to implement a data plane. The configured PFEs 130 may also implement one or more LFEs to implement the data plane. Hence, in order to monitor the health of the SMN, metrics associated with the control-plane components and the data-plane components should be collected, quantified, and monitored. Some embodiments include a set of one or more health management servers (HMS) 170 to compute one health score for both control-plane components and data-plane components. This one health score indicates the overall health of the SMN 100. Alternatively, other embodiments compute one health score for the control-plane components and another, separate health score for the data-plane components. These separate health scores indicate the overall health of the control plane and the data plane, separately. In some embodiments, one health score is computed for the control-plane components 120 and 125, the data-plane components 130 (and LFEs in some embodiments), and the management-plane components 140. And, in other embodiments, separate health scores are computed for the control-plane, data-plane, and management-plane components to indicate the health of the planes separately.

In some embodiments, the metrics associated with the control-plane, data-plane, and management-plane components are collected at each host 110 by a metrics collector 150, for use by the HMS 170. In some embodiments, each host 110 includes a database 160 for the metrics collector 150 to store the metrics of its host 110. The metrics collectors 150 of some embodiments only store their host's metrics in their local database 160, while, in other embodiments, the metrics collectors 150 send each other metrics collected on their host such that each database 160 on each host 110 in the SMN 100 stores all metrics for the SMN 100. In some embodiments, the HMS 170 collects these metrics associated with the control-plane, data-plane, and/or management-plane components from each database 160 on each host 110 in the SMN 100. In other embodiments, the metrics collectors 150 send the metrics directly to the HMS 170.

Figure 2:
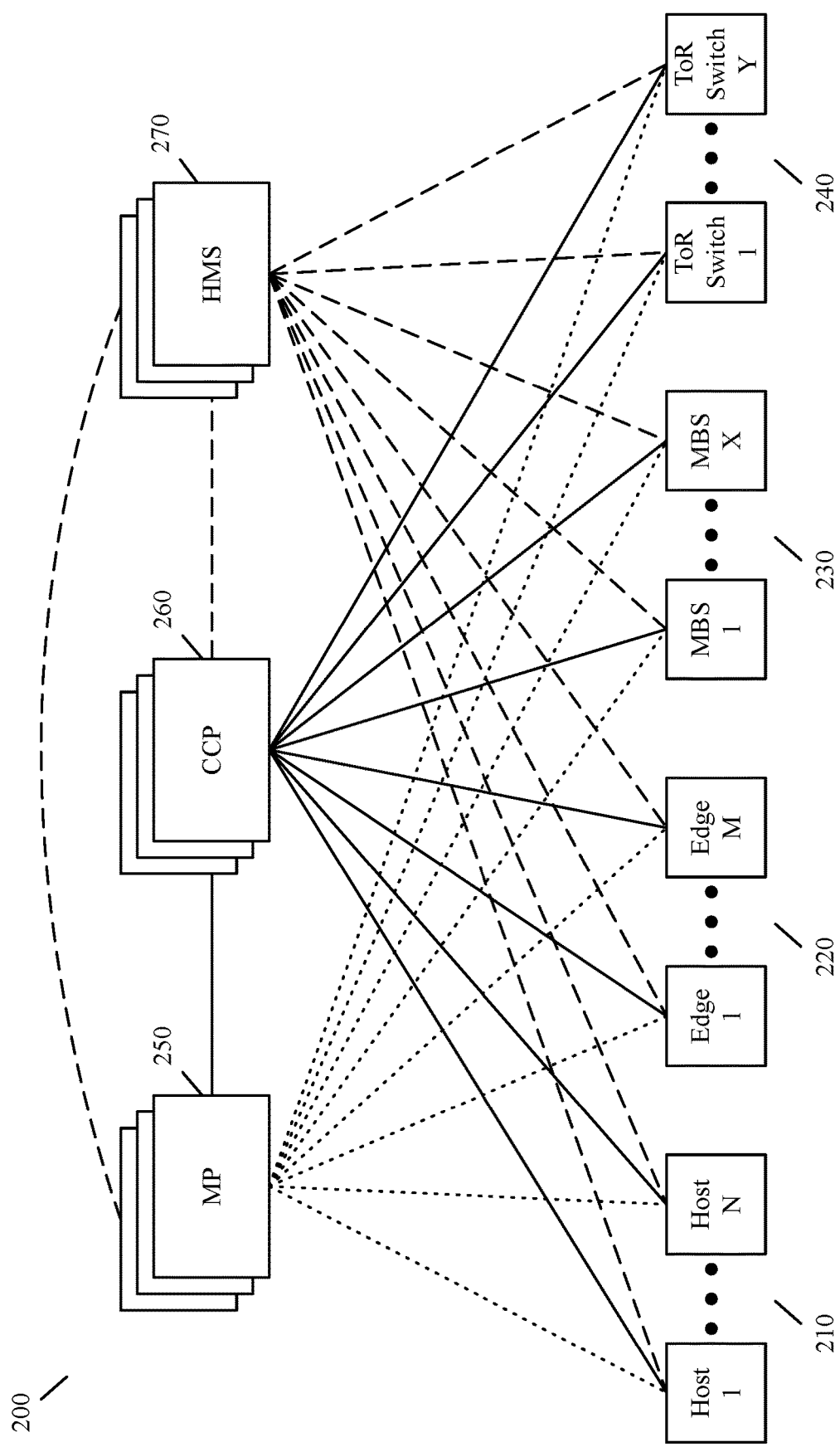
FIG. 2 illustrates another example SMN for which some embodiments of the invention are implemented.

The example SMN 100 illustrates hosts 110 for which metrics are collected. FIG. 2 illustrates another SMN 200 for collecting metrics and computing health scores. In this example, the SMN 200 includes hosts 210, edge appliances 220, middlebox services (MBS) 230, and Top of Rack (ToR) switches 240. The SMN 200 may include any number of these types of components. The SMN 200 also includes a management plane 250, a CCP 260, and an HMS 270. The hosts 210 may include any components described for the hosts 110 of FIG. 1, such as LCP modules, LMP modules, databases, and metrics collectors. In some embodiments, the edge appliances 220, middlebox services 230, and ToR switches 240 also include metrics collectors for collecting metrics, which send the metrics to the HMS 270. In other embodiments, one or more network managers (not shown) collect metrics for the edge appliances 220, middlebox services 230, and ToR switches 240 to send to the HMS 270. The HMS 270 collects metrics for all components of the SMN 200 (i.e., the hosts 210, edge appliances 220, middlebox services 230, ToR switches 240, management-plane servers 250, and CCP 260) to compute one or more health scores that quantify the health of the SMN 200.

Figure 3:
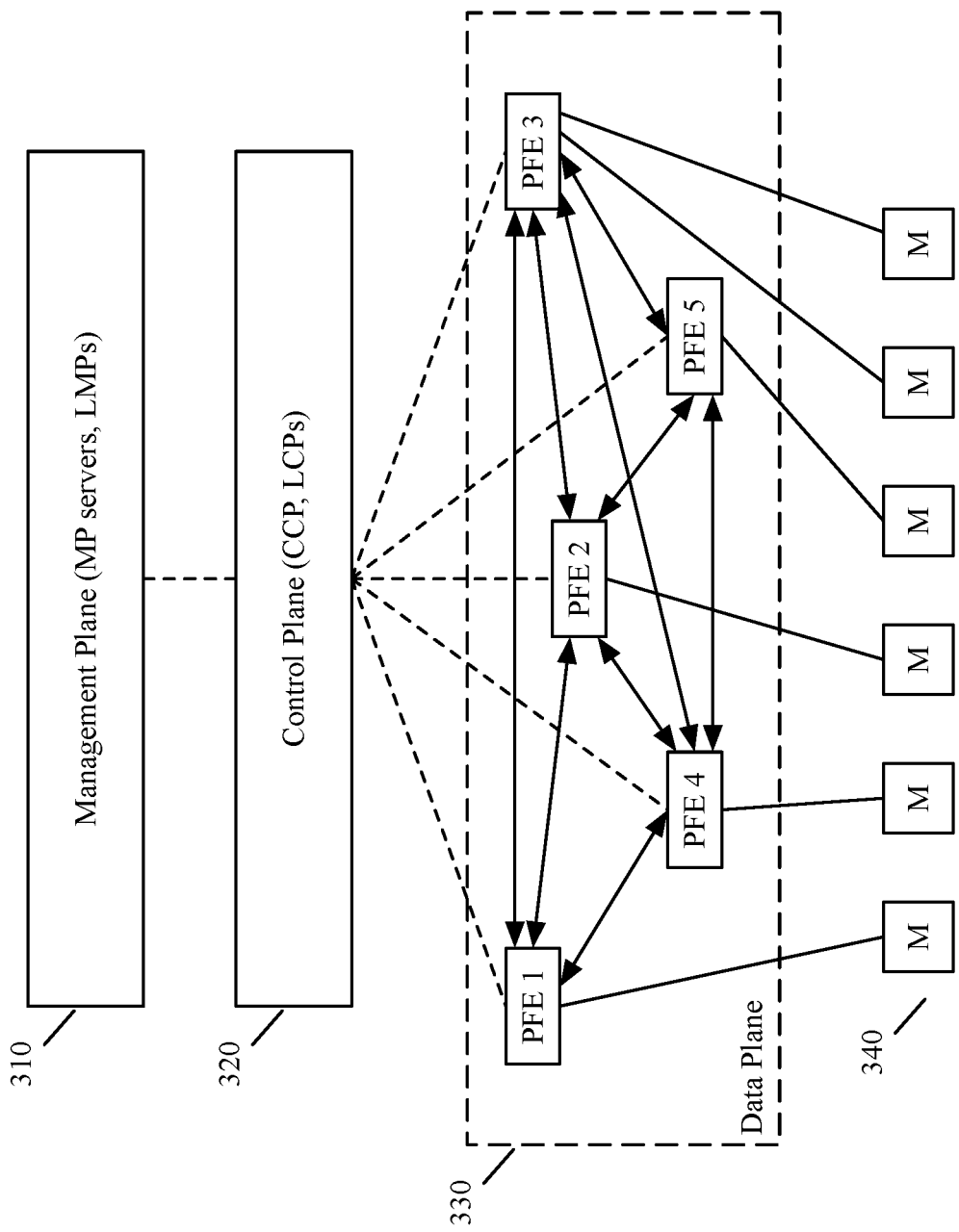
FIG. 3 illustrates an example configuration of a management plane, a control plane, and a data plane.

As discussed previously, the management plane configures the control plane, and the control plane configures PFEs to implement the data plane. FIG. 3 illustrates the configuration of these planes. The management plane 310, consisting of management-plane servers and LMP modules, configures the CCP and LCP modules of the control plane 320. Using the configuration provided by the management plane 310, the control plane 320 configures PFEs to implement the data plane 330. The example data plane 330 includes 5 PFEs that communicate with each other. For instance, PFE 1 communicates with PFEs 2, 3, and 4, and PFE 2 communicates with PFEs 1, 3, 4, and 5. The datapaths through which the PFEs communicate implement the data plane 330. The PFEs also communicate with machines 340, i.e., source and destinations of data messages exchanged between the PFEs implementing the data plane 330.

To quantify the health of the management plane 310, the control plane 320, and the data plane 330, various metrics for each plane must be collected. For the management plane 310, metrics may include the system memory, CPU (central processing unit), disk, and configuration maximum. These metrics are associated with the host on which the management plane 310 operates, and may be maintained and collected by the operating system (OS). In some embodiments, the management plane 310 includes a persistence store where the configuration data for the management plane 310 is stored. Metrics for the persistence store may include its read and write rate, its latency in reading and writing, and its CPU and memory usage. The persistence store in some embodiments is clustered and replicated. In such embodiments, metrics for the persistence store include whether all replicas of the persistence store are running, and whether it is running at a reduced capacity (e.g., one replica out of three are down). The management plane 310 of some embodiments includes a web-server hosting a REST (Representational State Transfer) API (Application Programming Interface) server that lets a user set and read the configuration for the management plane 310. Metrics for this web-server may include its runtime status (whether it is up and alive), its CPU and memory usage, its connection status to the persistence store, its connection status to the SMN's CCP, its API rate per second, its API latency per API, and if/how many concurrent API calls the web-server receives.

Other metrics related to the management plane 310 include (1) how much time (i.e., latency) intent takes to realize after an API call is processed, (2) if/how many pending intents are queued (i.e., waiting to be processed), (3) the management plane 310's connection to the web-server interface, (4) the latency in API calls to the web-server interface, inventory updates rate of the management plane 310, (5) whether the management plane 310's RBAC (Role-Based Access Control) service is up and running, and (6) whether the management plane 310's trust manager service (e.g., a sign in security service) is up and running. In some embodiments the management plane 310 includes management-plane servers and LMP modules, and metrics for the management plane 310 also include whether the management-plane servers are connected to the LMP modules. All of the metrics for the management plane 310 may be monitored and collected by metrics collectors operating on hosts in the SMN, network managers operating in the SMN, and/or any suitable application or module for collecting management-plane metrics.

For the control plane 320, metrics may include metrics of its system resources, such as memory, CPU, and disk, which are maintained and collected by the OS. Metrics may also include whether the CCP of the control plane 320 is connected to the management plane 310, and whether the CCP is connected to all hosts (i.e., to all LCP modules) in the SMN. Other metrics associated with the control plane 320 include the control plane 320's span calculations speed and distributing, e.g., a calculation of which hosts the control plane 320 spans and the speed at which the CCP distributes the span calculation to its LCP modules. All of the metrics for the control plane 320 may be monitored and collected by metrics collectors operating on hosts in the SMN, network managers operating in the SMN, and/or any suitable application or module for collecting control-plane metrics.

Figure 4:
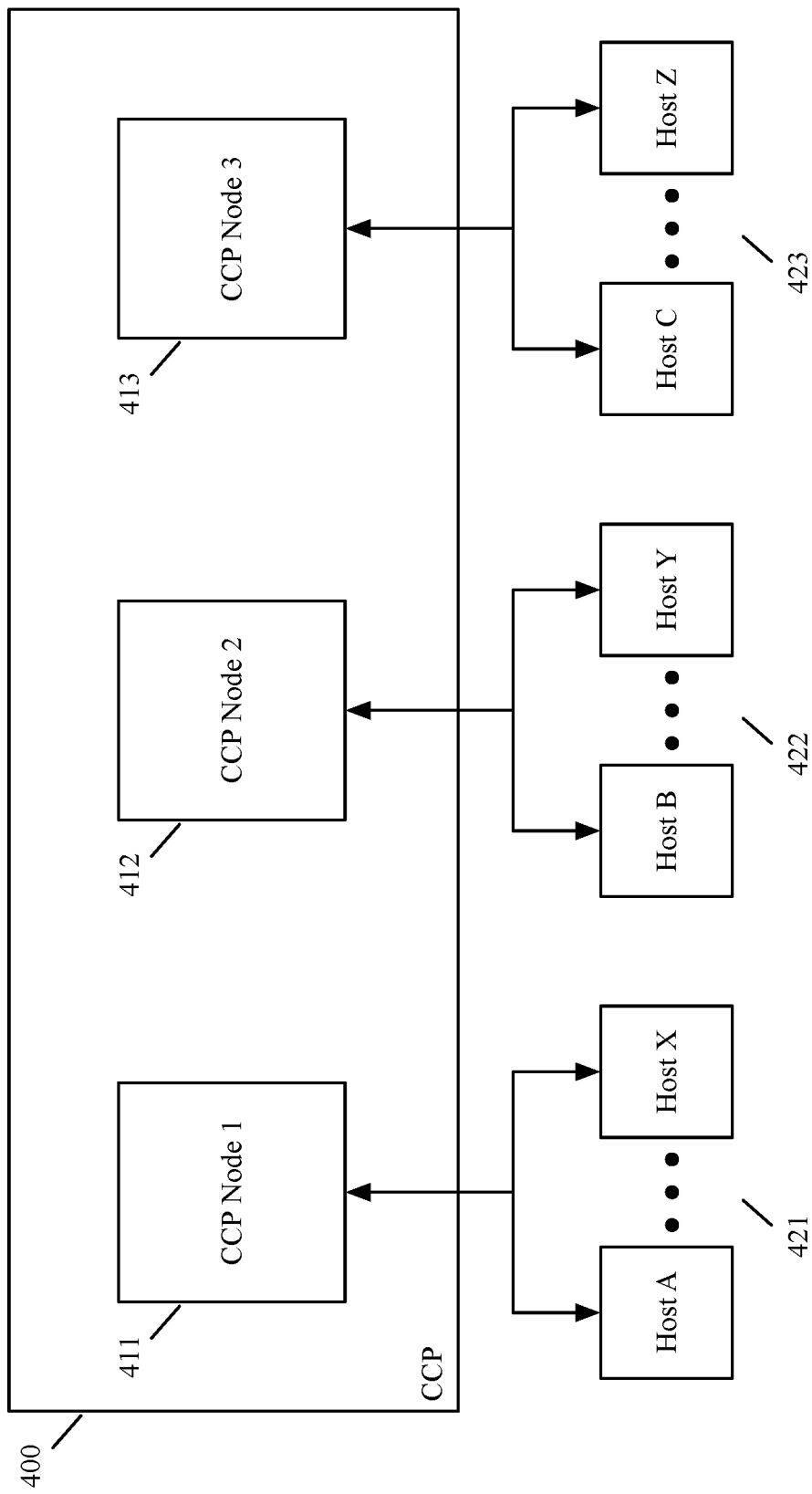
FIG. 4 illustrates an example CCP of a control plane that configures PFEs in an SMN.

In some embodiments, metrics related to the control plane may also include the CCP's cluster health of the control plane, such as the health of all CCP nodes of the CCP, and sharding the hosts of the SMN across the CCP nodes. FIG. 4 illustrates an example CCP 400 with three CCP nodes 411, 412, and 413. Each CCP node 411-413 is coupled to one or more hosts 421, 422, and 423, respectively, such that an LCP module executing on a host communicates with its coupled CCP node in order to communicate with the CCP. A CCP may include any number of CCP nodes, and each CCP node may communicate with any number of hosts. In such embodiments where a CCP consists of multiple CCP nodes, the health of all CCP nodes of the CCP, i.e., whether all CCP nodes are up and running, may be used as a metric for the control plane. The distribution of hosts 421-423 among the CCP nodes 411-413, i.e., the sharding of the hosts among the CCP nodes, may also be used as a metric for the health of the control plane. For example, it may be defined that an even distribution of hosts among CCP nodes produces a better metric than an uneven distribution, indicating that an overloaded CCP node may result in a failure of that CCP node.

Referring back to FIG. 3, metrics for the data plane 330 include any metrics associated with the PFEs implementing the data plane and their datapaths, metrics associated with any LFEs implemented by the PFEs, and metrics associated with the hosts on which the PFEs operate. Data-plane metrics may also include metrics of its system resources, such as memory, CPU, disk, and network (e.g., packets per second, drops, throughput, etc.) which are maintained and collected by the OS. Metrics for the data plane 330 also include (1) control-plane 320 connectivity (e.g., whether the hosts of the PFEs are connected to the CCP), (2) management-plane 310 connectivity (e.g., whether the hosts of the PFEs are connected to the management plane 310), and (3) connectivity to other hosts (e.g., whether PFEs on one host are connected to PFEs on other hosts). In some embodiments, the configuration maximum of the data plane 330 is used as a metric, such as the maximum number of logical elements permitted for the network. Failures on realization and pending realization may also be considered as metrics for the data plane 330. Important processes used by data path forwarding elements executing on hosts may also be used for metrics. Examples of such processes are NestDB (an embedded persistent or in-memory database), Iked (Internet Key Exchange Daemon), and FRR (Free Range Routing). All metrics for the data plane 330 may be monitored and collected by metrics collectors operating on hosts in the SMN, and/or any suitable application or module for collecting data-plane metrics.

Figure 5:
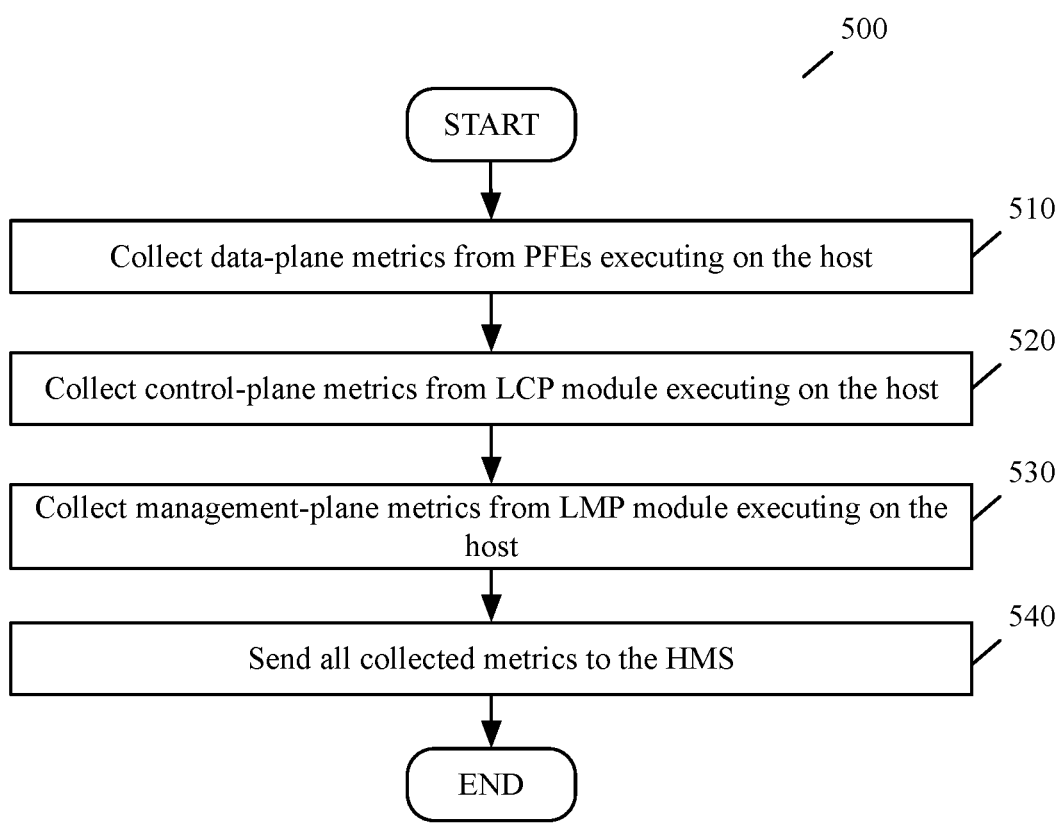
FIG. 5 conceptually illustrates a process of some embodiments for collecting metrics on a host computer.

In some embodiments, metrics associated with the control-plane, data-plane, and management-plane components are collected at each host computer of an SMN. FIG. 5 conceptually illustrates a process 500 for collecting such metrics. The process 500 may be performed by a metrics collector operating on a host, such as any of the metric collectors 150 of FIG. 1. In some embodiments, this process 500 is performed periodically, such that metrics are collected and stored at regular time intervals, e.g., every five seconds, every five minutes, etc. Collecting metrics periodically ensures that the health of the SMN may be regularly quantified and monitored to understand the overall health of the SMN and how its health changes over time.

The process 500 begins by collecting (at 510) data-plane metrics from PFEs executing on the host. The metrics collector collects any metrics related to the PFEs operating on its host, and any metrics associated with LFEs implemented by those PFEs. Examples of data-plane metrics include: (1) a number of data messages exchanged per second, (2) a number of dropped data messages per second, (3) a number of bytes per second, (4) a number of data message errors per second, (5) a number of data message errors per second, (6) throughput percentage, (7) latency, etc. Next, the process 500 collects (at 520) control-plane metrics from the LCP module executing on the host. The metrics collector may collect any metrics associated with the control plane, and, more specifically, the LCP module, such as its connection status to the CCP. Examples of control-plane metrics also include: (1) if and when a local data plane of a host disconnects from the CCP, (2) Bidirectional Forwarding Detection (BFD) misses of a transport node (e.g., a host) and BFD statuses with other transport nodes, (3) edge cluster peer status, (4) edge-agent health (which manages high availability and failover), etc.

Then, the process 500 collects (at 530) management-plane metrics from the LMP module executing on the host. The metrics collector may collect any metrics associated with the LMP, such as its connection status to the management-plane servers, and metrics related to the data exchanged between the LMP module and the management-plane servers. In some embodiments, there is no LMP module executing on the host, and, in such embodiments, the metrics collector may collect management-plane metrics form the LCP module (which connects to the CCP configured by the management-plane servers), or the metrics collector may not collect any metrics for the management plane. In embodiments in which the metrics collector does not collect management-plane metrics, network managers in the SMN may instead collect metrics for the management plane and send the metrics to the HMS. After collecting all metrics, the process 500 sends (at 540) all of the collected metrics to the HMS. Then, the process 500 ends. In some embodiments, the metrics collector sends the metrics over to the HMS to be stored at the HMS. In other embodiments, the metrics collector also stores the collected metrics in its own database on the host. Once the metrics are sent to the HMS, the HMS may use the metrics to quantify the health of the data plane, control plane, and management plane.

Figure 6:
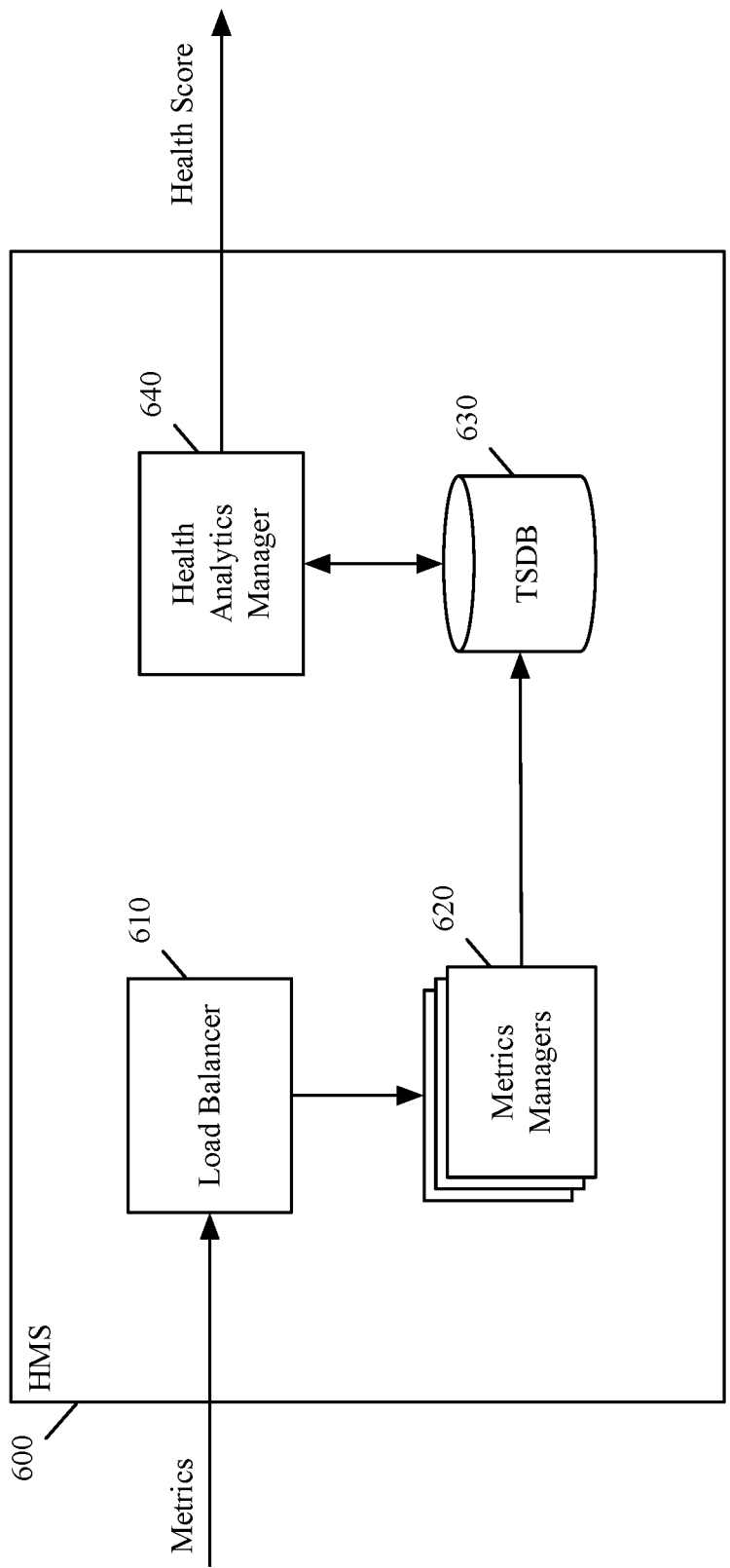
FIG. 6 illustrates an example health metrics server for collecting and storing metrics and for computing health scores.

FIG. 6 illustrates an example HMS 600 and its components that use metrics to quantify the health of composite components. In some embodiments, the HMS 600 includes a load balancer 610, a set of metrics managers 620, a time-series database (TSDB) 630, and a health analytics manager 640. When the HMS 600 receives metrics from metrics collectors, network managers, and/or other applications and modules, the metrics are received at the load balancer 610. The load balancer 610 distributes the metrics among the set of metrics managers 620. In some embodiments, the load balancer 610 ensures that all metrics for a particular component (e.g., a particular PFE, a particular LFE, or a particular plane) are sent to one metrics manager 620, such that metrics for that component are processed by the same metrics manager 620. The load balancer 610 of some embodiments receives metrics collected at regular intervals, so the load balancer 610 must send related metrics collected at different times to the same metrics manager.

After receiving the metrics from the load balancer 610, each of the metrics managers 620 process the metrics to store in the TSDB 630. In some embodiments, the metrics managers 620 perform periodic rollups on the metrics. For example, a metrics manager 620 may receive the same latency metric for a particular network element every five seconds. The metrics manager 620 may store these metrics in a local memory until an aggregation timer fires. Once the timer fires, the metrics manager 620 aggregates (i.e., averages) all of these latency metrics up to five minutes, and stores the five-minute level metrics in the TSDB 630. For example, a metrics manager may average 20 memory usage metrics for a host collected at five-second intervals into one memory usage metric for that host. In some embodiments, the metrics managers 620 aggregate metrics even further and retrieve metrics from the TSDB 630 once another aggregation timer fires. For example, the metrics manager 620 may aggregate five-minute metrics up to one-hour metrics, and then one-hour metrics up to one day. In doing so, the TSDB 630 does not store smaller increment metrics for an extended period of time, saving storage space in the TSDB 630.

The TSDB 630 stores the metrics (and the aggregated metrics) from the metrics managers 620. In some embodiments, where periodic rollups of metrics are performed, the TSDB 630 deletes smaller increment metrics after they have been aggregated. For instance, if a set of five-minute metrics are aggregated to one-hour metrics, the TSDB 630 may delete the five-minute metrics. In some embodiments, the TSDB 630 stores different aggregation level metrics in separate tables, such that, when lower-level aggregation metrics are to be deleted, the TSDB 630 deletes the entire table instead of individual rows of one larger table.

Using the metrics stored in the TSDB 630, the health analytics manager 640 of some embodiments computes various health scores for various composite components of the SMN. For instance, the health analytics manager 640 may compute a health score for the data-plane and control-plane components, for a particular LFE, and for a particular logical network or logical sub-network. The health analytics manager 640 retrieves any necessary metrics for computing a health score, computes the health score, provides the health score to a user (e.g., through a UI), and stores the health score in the TSDB 630. In some embodiments, the health analytics manager 640 retrieves a set of health scores for a particular composite component from the TSDB 640 to provide to the user for monitoring the health of the composite component over time.

Figure 7:
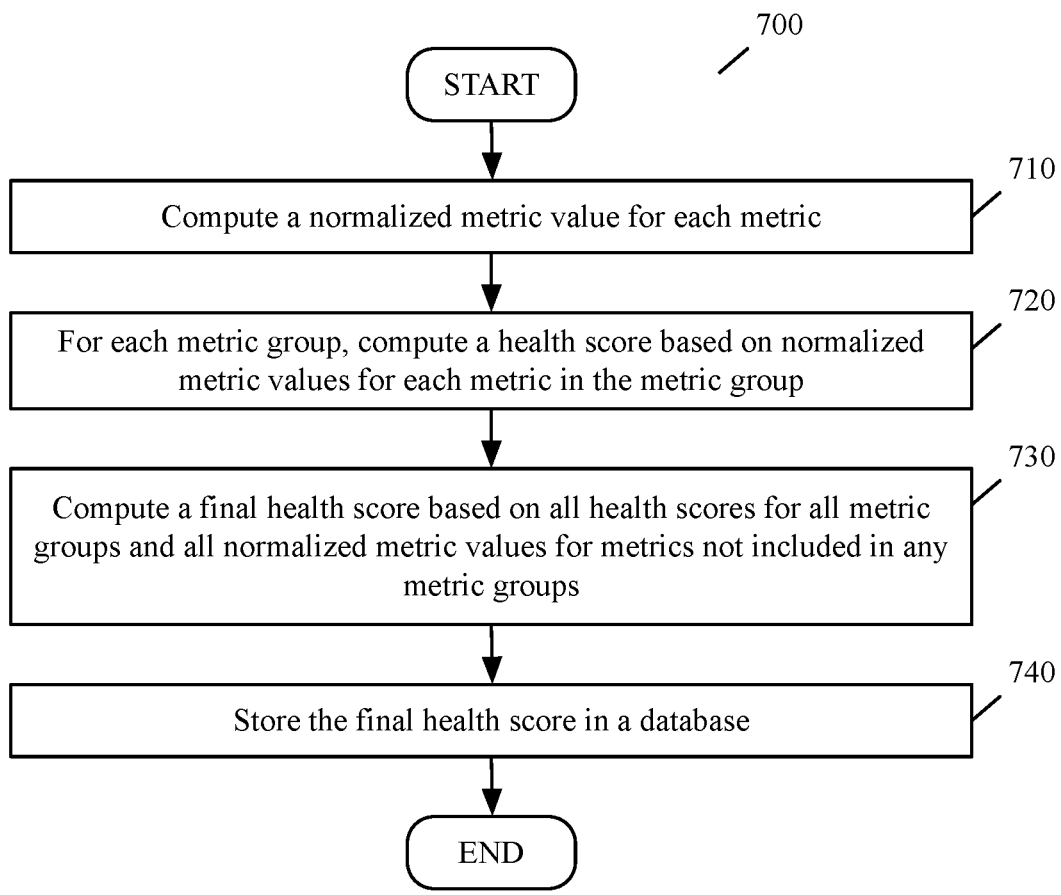
FIG. 7 conceptually illustrates a process of some embodiments for computing a health score for a composite component FIG. 8 conceptually illustrates a process of some embodiments for computing a health score for an SMN based on its control-plane, data-plane, and management-plane components.

FIG. 7 conceptually illustrates a process 700 of some embodiments for computing a health score for a composite component. This process 700 may be performed by the health analytics manager of an HMS, such as the health analytics manager 640 of FIG. 6. The process 700 may be performed to compute one health score to express the overall health of a composite component, such as for an SMN (based on its control, data, and/or management-plane components), an LFE, a logical network, or a logical sub-network. The process 700 begins by computing (at 710) a normalized metric value for each metric. For numerical metrics, the health analytics manager of some embodiments takes the value of the collected metric and divides it by a maximum value of that metric in order to compute a normalized value for that metric. For example, the health analytics manager may receive a metric specifying the number of data messages per second processed by a particular PFE of the SMN, such as 50 data messages per second. If the maximum value for that metric is 100 data messages per second, the normalized metric value for that metric is 0.5 (in embodiments where normalized metric values are on a 0 to 1 scale). As another example, the health analytics manager may use a metric specifying a host's connectivity to CCP metric, which may be a value of 1 for "YES" or 0 for "NO." The maximum value for this metric is 1, so if the host is connected to the CCP, the normalized metric value is 1, and if the host is not connected to the CCP, the normalized metric value is 0. In some embodiments, the maximum value for a metric is determined by the health analytics manager. In other embodiments, the maximum value for a metric is determined by a user or administrator.

In some embodiments, the health analytics manager computes normalized metric values using rules and thresholds. For example, for a storage usage metric for a particular network element, a rule may be defined such that when the storage usage reaches 60%, the normalized metric value for the metric is 50 (in embodiments where normalized metric values are valued on a 1 to 100 scale). Another rule may be defined for this metric such that when the storage usage reaches 90%, the normalized metric value drops to a value of 10. Any suitable threshold or rule may be defined for any metric. In other embodiments, a standard deviation technique for computing normalized metric values may also be used, such that when a collected metric falls outside of the metric's standard deviation, the normalized metric value drops. For example, for a disk-usage metric, if the collected disk usage is outside the standard deviation range for the metric, the normalized metric value is 75, i.e., if the mean of the disk usage is 50, the standard deviation is 2, and the recorded disk usage is 56, the normalized metric value for that metric is 75. In some embodiments, all normalized metric values are computed using one technique. In other embodiments, different normalized metric values are computed using different techniques.

Next, the process 700 computes (at 720) a health score for each metric group based on normalized metric values for each metric in the metric group. In some embodiments, a user or administrator defines metric groups in order to group subsets of metrics and weigh some subsets of metrics differently than other subsets of metrics. For instance, a subset of metrics associated with a particular PFE may be defined as a metric group. Conjunctively, or alternatively, a subset of metrics associated with a particular metric type, such as storage usage, may be defined to be part of a metric group. A metric group may consist of only individual metrics as members, or may also include another metric group as a members. For example, members of a disk metric group may include latency metrics, disk error metrics, and partition disk-usage metrics. Members of an edge appliance group may include a disk metric group, a CPU metric group, and a memory metric group. Members of an edge health group may include an edge appliance metric group and CCP connection status metrics. Metric groups may be defined using any suitable criteria, and may be modified at any time.

In some embodiments, the health analytics manager computes these secondary health scores (i.e., secondary to the final, primary health score for the composite component) for metric groups by summing the normalized metric values of the group's members based on weights assigned to the metrics by users and/or administrators. Other embodiments use the normalized metric values differently to compute the secondary health scores. The weights assigned to each metric of some embodiments, when added together, sum to 100% (when the weights are values within a range of 0% to 100%). The weights in other embodiments, when added together, sum to 1 (when the weights are values within a range of 0 to 1). For example, a first metric may have a normalized metric value of 80 and have an assigned weight of 40%, and a second metric may have a normalized metric value of 60 and have an assigned weight of 60%. Summing these normalized metric values based on their assigned weights results in an overall health score of 68.

The health analytics manager computes a separate, secondary health score for each metric group using the subset of metrics included in the metric group. For example, a user may define a control-plane metric group that includes all metrics related to the control plane. The health analytics manager would then compute a health score for the control-plane metric group. In some embodiments, if a first metric group includes a second metric group as a member, the second metric group's health score is computed first, and the health score for the first metric group is computed using the health score for the second group and normalized metric values of any other members. For example, if the user defines the control-plane metric group and an LCP-module metric group that includes all metrics related to the LCP modules, then the LCP-module metric group would be a member of the control-plane metric group. The health analytics manager would first compute a health score for the LCP-module metric group and use that health score and normalized metric values for other control-plane metrics to compute the control-plane metric group health score. In some embodiments, no metric groups have been defined, and the process 700 proceeds from step 710 to step 730.

Then, the process 700 computes (at 730) a final health score for the component based on all health scores for all metric groups and all normalized metric values for metrics not included in any metric groups. The health analytics manager may sum these values based on weights assigned to the metric groups and the metrics. The health analytics manager may also combine these values in any suitable way to generate the final health score. In the example of computing an overall health score for an SMN based on control-plane and data-plane components, a user may define a control-plane metric group and a data-plane metric group. In order to compute the final health score, the health analytics manager sums the health scores of these two metric groups based on weights assigned to the groups. Alternatively, if the user only defines a control-plane metric group and not a data-plane metric group, the health analytics manager sums the health score of the control-plane metric group with the normalized metric values of the data-plane component metrics using weights assigned to the control-plane metric group and the data-plane component metrics. Once the final health score is computed, the process 700 stores (at 740) the final health score for the composite component in a database. The health analytics manager stores the health score in the TSDB of the HMS. In some embodiments, the health analytics manager also stores the normalized metric values for the metrics, the secondary health scores computed for the metric groups, and the weights assigned to the metrics and the metric groups. Then, the process 700 ends. In some embodiments, the health analytics manager performs this process 700 for a particular composite component periodically based on a defined time interval, e.g., every five minutes, and each health score is stored in the TSDB. A user or administrator may define the time interval at which the health score is computed for the component.

Figure 8:
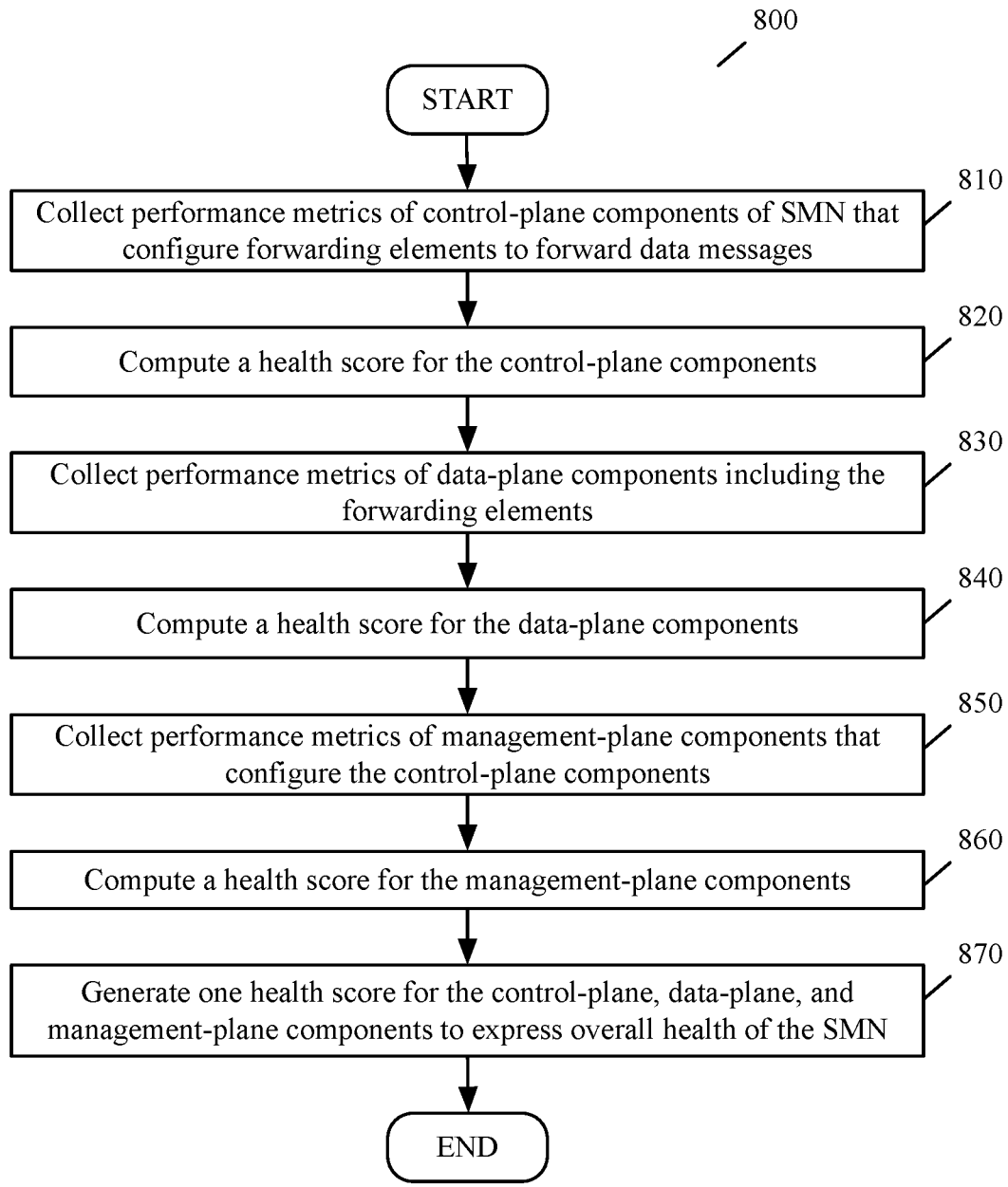

FIG. 8 conceptually illustrates a process 800 for computing a health score for an SMN based on its control-plane, data-plane, and management-plane components. This process 800 may be performed by a health analytics manager of an HMS, such as the health analytics manager 640 of FIG. 6. In some embodiments, this process 800 is performed using only data-plane and control-plane component metrics to express the overall health of the SMN. In other embodiments, the process 800 also uses management-plane component metrics to express the SMN's overall health. Any health score computations may be computed using the process 700 of FIG. 7.

The process 800 begins by collecting (at 810) performance metrics of control-plane components of the SMN that configure forwarding elements to forward data messages. The health analytics manager collects the control-plane component metrics from a TSDB, such as the TSDB 630 of FIG. 6, or any other suitable database. The forwarding elements in some embodiments are the PFEs executing on hosts in the SMN and hardware PFEs executing in the SMN. In other embodiments, the forwarding elements are the LFEs implemented by the PFEs in the SMN. In some embodiments, the performance metrics from the control-plane components include (1) metrics associated with the CCP of the control plane, (2) metrics associated with the host computer on which the CCP operates, (3) metrics associated with each of the LCP modules of the control plane, and (4) metrics associated with each host computer on which the LCP modules operate. Any suitable control-plane component metrics may be collected by the health analytics manager. The forwarding elements may include PFEs and/or LFEs. In some embodiments, one or more metrics needed to compute a health score for a component cannot be collected by the health analytics manager, e.g., it is not found in the TSDB. In such embodiments, the normalized metric value for the unknown metric value is 0, and the composite component's health score is computed using 0 as that metric's normalized metric value. Then, the process 800 computes (at 820) a health score for the control-plane components. The health analytics manager computes this health score using the process 700 of FIG. 7. In some embodiments, the health analytics manager stores the control-plane health score in the TSDB of the HMS and reports it to the user to provide an indication of the health of the control plane.

Next, the process 800 collects (at 830) performance metrics of data-plane components including the forwarding elements. The health analytics manager collects these data-plane metrics from the TSDB of the HMS or some other database. In some embodiments, the data-plane metrics are associated with the PFEs in the SMN. In other embodiments, the data-plane metrics are associated with the LFEs implemented by the PFEs in the SMN. Still, in other embodiments, the data-plane metrics are associated with both PFEs and LFEs. The performance metrics of the data-plane components in some embodiments include metrics associated with the datapaths of the forwarding elements of the SMN (i.e., LFEs, PFEs, or both) and metrics associated with the data messages exchanged between the forwarding elements of the SMN. Then, the process 800 computes (at 840) a health score for the data-plane components. The health analytics manager may compute this health score using the process 700 of FIG. 7 to indicate the overall health of the data plane of the SMN.

Next, the process 800 collects (at 850) performance metrics of management-plane components that configure the control-plane components. The management-plane components may include a set of management servers and LMP modules operating on hosts in the SMN. The performance metrics of the management-plane components may be related to the management-plane servers, the LMP modules, the hosts on which the management-plane servers and LMP modules operate, the configuration data received by the management-plane components (e.g., from a user), and the configuration information sent by the management-plane components to the control-plane components to configure the control plane. Then, the process 800 computes (at 860) a health score for the management-plane components. Similar to the health score for the control-plane components and the health score for the data-plane components, the health analytics manager computes the management-plane component health score using the process 700 of FIG. 7 to indicate the overall health of the management plane of the SMN.

Then, the process 800 generates (at 870) one health score for the control-plane, data-plane, and management-plane components to express the overall health of the SMN. In some embodiments, the health analytics manager sums the health scores of the individual planes based on weights assigned to the planes to compute the overall health score of the SMN. In other embodiments, the health analytics manager sums the normalized metric values for the control-plane, data-plane, and management-plane metrics based on weights assigned to the metrics, if no weights are assigned to plane metric groups. Then, the process 800 ends. In some embodiments, the overall health score is provided in a report to indicate the health of the SMN, and is stored in the TSDB of the HMS. In other embodiments, the separate health scores for the control plane, data plane, and management plane are instead provided in the report to indicate the overall health of the planes individually, and are also stored in the TSDB of the HMS in order to monitor the planes individually and to understand which plane, if any, is causing a poor health of the SMN. Still, in other embodiments, the overall health score and the individual plane health scores are provided in the report and stored.

In some embodiments, the health analytics manager computes a health score based on metrics for distributed network elements, such as LFEs, or entire logical networks. As discussed previously, the control plane of an SMN configures PFEs to implement a conceptual data plane through which the PFEs exchange data messages. In some embodiments, the multiple PFEs are configured to implement one or more LFEs, and the data plane is implemented by an LFE or by a set of related LFEs (e.g., by a set of connected logical switches and routers). The LFEs implemented by the PFEs may be part of a logical network, and health scores can be computed to express the overall health of one distributed network element (i.e., one LFE) or of an entire logical network.

Figure 9:
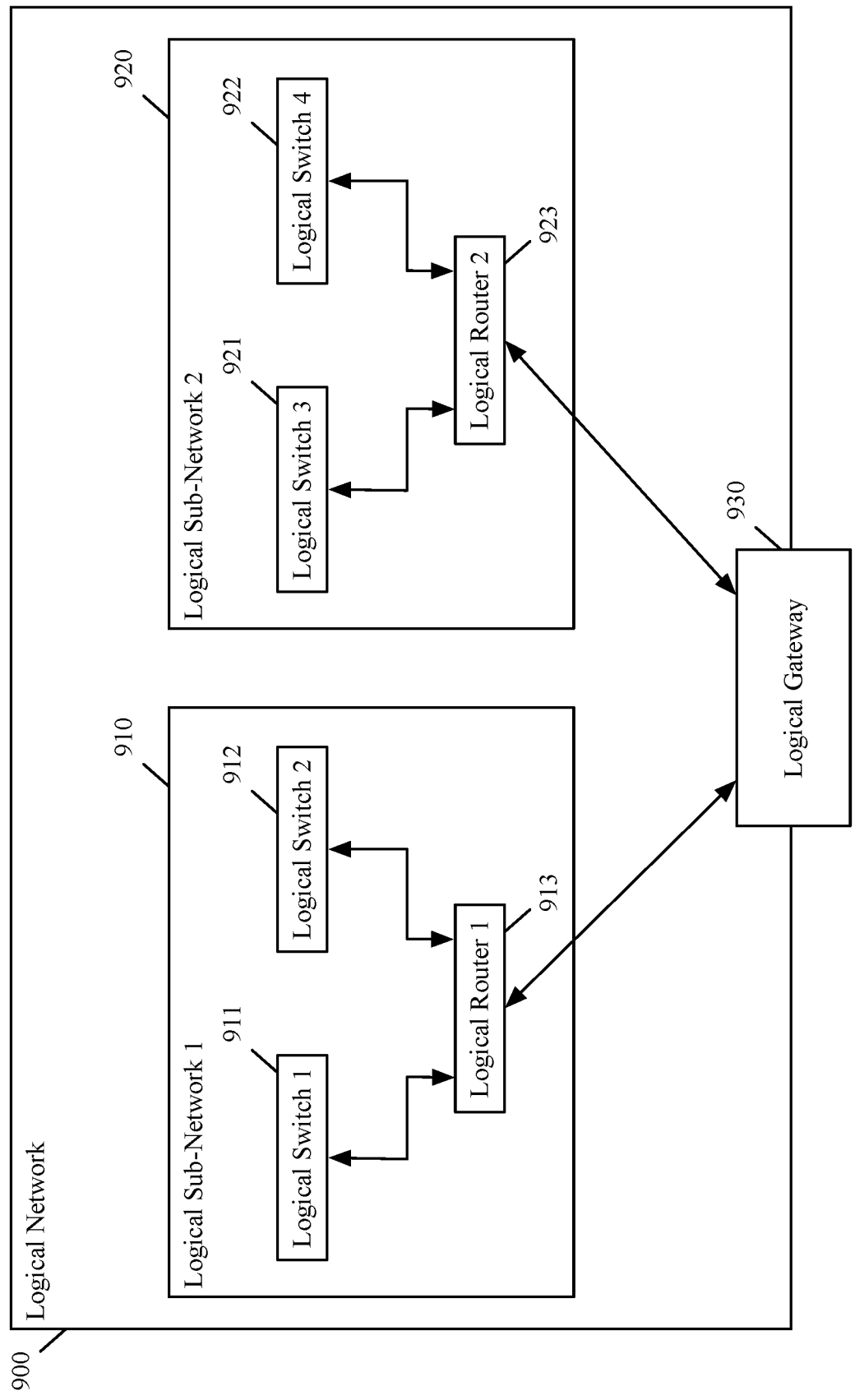
FIG. 9 illustrates an example logical network for which metrics may be collected and for which health scores may be computed.

FIG. 9 illustrates an example logical network 900 for which an HMS may store metrics and compute health scores. The logical network 900 includes a first logical sub-network 910 that consists of two logical switches 911 and 912 and a logical router 913. The logical switches 911 and 912 communicate with each other through the logical router 913. The logical network 900 also includes a second logical sub-network 920, which includes logical switches 921 and 922 and a logical router 923. The logical switches 921 and 922 communicate with each other through the logical router 923. Logical switches in different logical sub-networks communicate through the logical gateway 930 of the logical network 900. All of these logical components of the logical network 900 are implemented by physical components of a physical network, such as components described in FIG. 1 and FIG. 2. For instance, the logical switch 911 may be implemented by two PFEs operating on one host, while the logical switch 921 may be implemented by three PFEs operating on separate hosts. Any number of physical components operating on any number of hosts may implement a logical component of a logical network.

Figure 10:
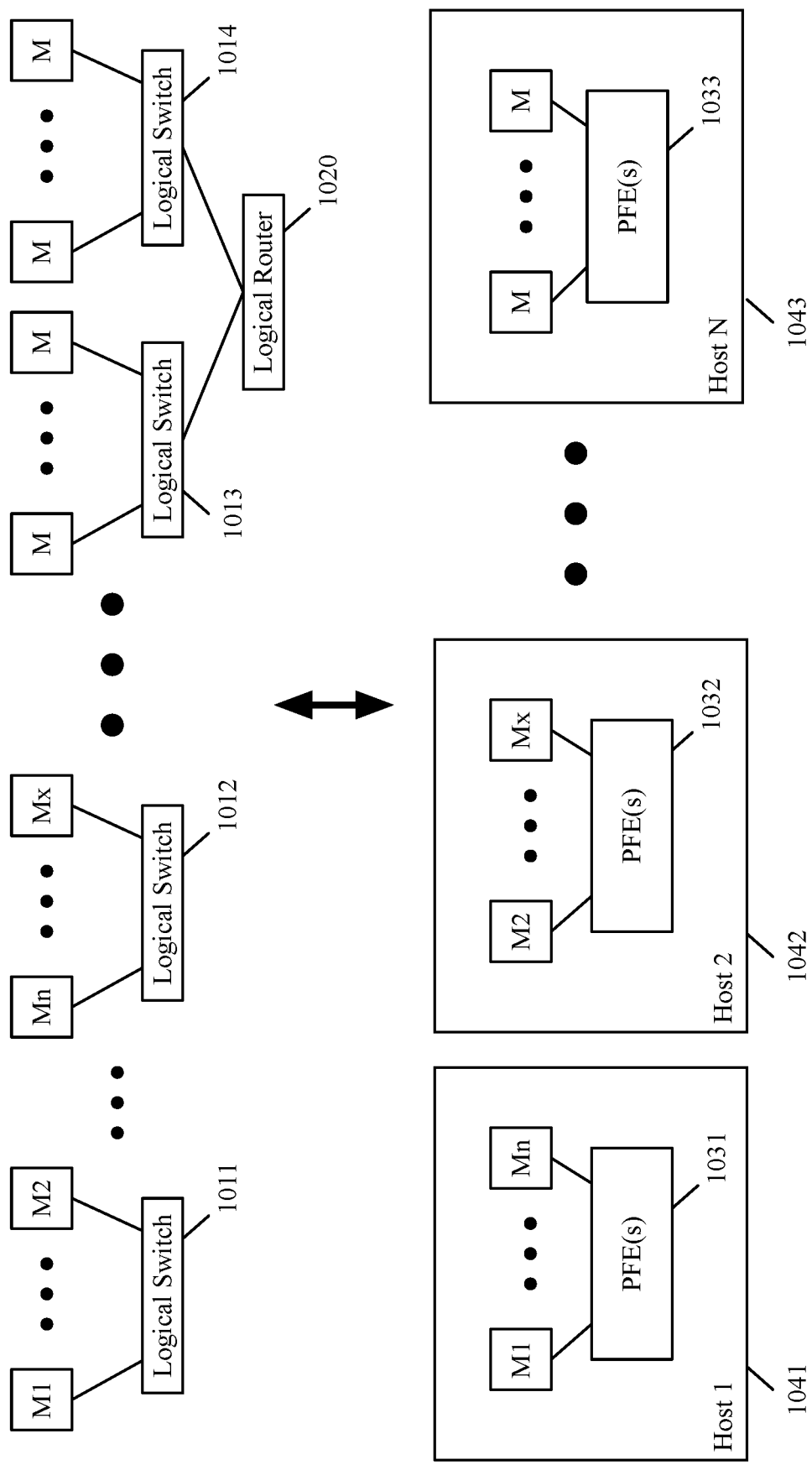
FIG. 10 illustrates an example of logical components of logical networks defined across a shared set of physical forwarding elements.

FIG. 10 illustrates an example of logical components 1011-1020 of logical networks defined across a shared set of physical forwarding elements 1031-1033. Specifically, this figure illustrates a number of machines that execute physical forwarding elements on several hosts. The shared physical forwarding elements 1031-1033 can implement any arbitrary number of logical switches and logical routers. One LFE can communicatively connect VMs on different hosts. For example, the logical switch 1011 connects machines M1 and M2 that execute on hosts 1041 and 1042, while the logical switch 1012 connects machines Mn and Mx that execute on these two hosts.

The logical forwarding element or elements of one logical network isolate the data message communication between their network's VMs from the data message communication between another logical network's VMs. In some embodiments, this isolation is achieved through the association of logical network identifiers (LNIs) with the data messages that are communicated between the logical network's VMs. In some of these embodiments, such LNIs are inserted in tunnel headers of the tunnels that are established between the shared network elements (e.g., the hosts, standalone service appliances, standalone forwarding elements, etc.).

In hypervisors, software switches are sometimes referred to as virtual switches because they are software, and they provide the VMs with shared access to the physical network interface cards (PNICs) of the host. However, in this document, software switches are referred to as physical switches because they are items in the physical world. This terminology also differentiates software switches from logical switches, which are abstractions of the types of connections that are provided by the software switches. There are various mechanisms for creating logical switches from software switches. Virtual Extensible Local Area Network (VXLAN) provides one manner for creating such logical switches. The VXLAN standard is described in Mahalingam, Mallik; Dutt, Dinesh G.; et al. (2013-05-08), "VXLAN: A Framework for Overlaying Virtualized Layer 2 Networks over Layer 3 Networks", IETF. Host service modules and standalone service appliances (not shown) may also implement any arbitrary number of logical distributed middleboxes for providing any arbitrary number of services in the logical networks. Examples of such services include firewall services, load balancing services, DNAT services, etc.

Figure 11:
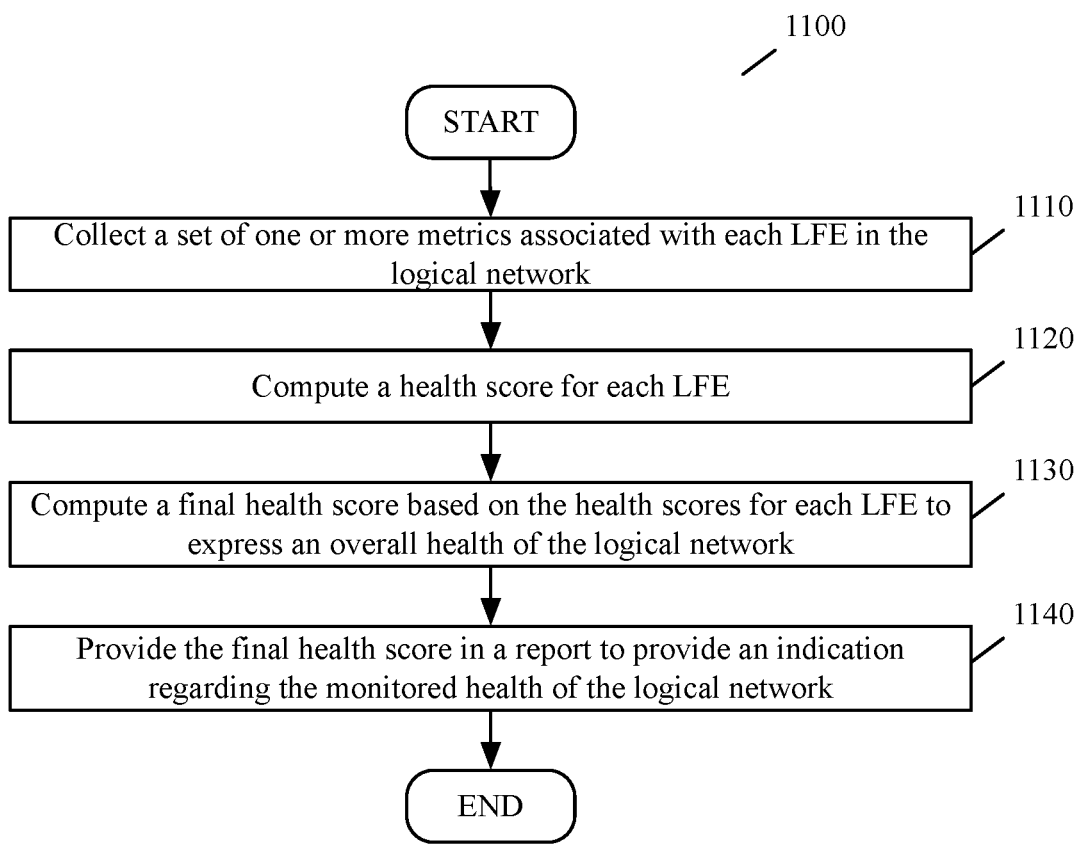
FIG. 11 conceptually illustrates a process of some embodiments for computing a health score for a logical network.

In some embodiments, an HMS of an SMN may compute a health score for a logical network. FIG. 11 conceptually illustrates a process 1100 of some embodiments for computing a health score for a logical network. This process 1100 may be performed by a health analytics manager of an HMS, such as the health analytics manager 640 of FIG. 6. In some embodiments, the logical network for which a health score is computed is the entire logical network, meaning that the health score is computed based on metrics for all LFEs of the logical network. In other embodiments, the logical network for which a health score is computed is a smaller first logical sub-network of a larger second logical network. In such embodiments, the health score for the logical sub-network only indicates the health of the LFEs in the logical sub-network, and not any other LFEs in the entire logical network. The process 1100 will be described below according to the logical network 900 of FIG. 9. However, the process 1100 may be performed for any logical network or any logical sub-network, such as for the logical sub-networks 910 or 920 of FIG. 9.

The process 1100 begins by collecting (at 1110) a set of one or more metrics associated with each LFE in the logical network. The health analytics manager collects metrics from the TSDB of the HMS, and/or a database related to the LFEs of the logical network. These metrics may be associated with the PFEs that implement the LFEs, the datapaths along which data messages are sent between the LFEs in the logical network, and the hosts on which the PFEs operate (for PFEs that are software forwarding elements operating on hosts).

Next, the process 1100 computes (at 1120) a health score for each LFE in the network. For each LFE, the health analytics manager computes normalized metric values for each metric related to the LFE and sums these values based on weights assigned to the metrics to generate the health score for that LFE. These secondary health scores computed for each LFE can be considered metric group health scores, with each LFE being defined as its own metric group. Examples of metric groups defined for metrics of an LFE include (1) a metric group including all metrics for a particular PFE implementing the LFE, (2) a metric group including all metrics associated with outgoing data messages associated with a particular PFE, (3) a metric group including all metrics associated with a particular host on which a PFE implementing the LFE operates, etc.

Then, the process 1100 computes (at 1130) a final health score for the logical network based on the health scores for each LFE in order to express the overall health of the logical network. The health analytics manager sums all health scores for all LFEs of the logical network based on weights assigned to the LFEs. For instance, if a user or administrator values logical gateways of the logical network over logical switches and routers, the user may assign a larger weight to the logical gateways. In doing so, the final health score for the logical network takes the health of the logical gateway(s) of the logical network into account more than any logical switches and logical routers in the network, which provides the user with a more customized health monitoring scheme for the logical network.

The process 1100 then provides (at 1140) the final health score in a report to provide an indication regarding the monitored health of the logical network. The report in some embodiments is provided through a text message, an email, and/or a UI. The report may also be provided through an API. For instance, the report may use a push model to provide the report. The health analytics manager pushes the report in an API to another program to provide the logical network's health score to the user. Alternatively, the report may use a pull model to provide the report. For example, another program may send an API request to the health analytics manager requesting the report, and the health analytics manager may send an API response providing the report. In some embodiments, the report includes only the final health score for the logical network. In other embodiments, the report includes additional information, such as the secondary health scores for each LFE (i.e., health scores for any metric groups), the normalized metric values for each metric used in computing the final health score, and the weights used in computing the health scores. The report may also include other information, which will be described further below. The process 1100 then ends.

Figure 12:
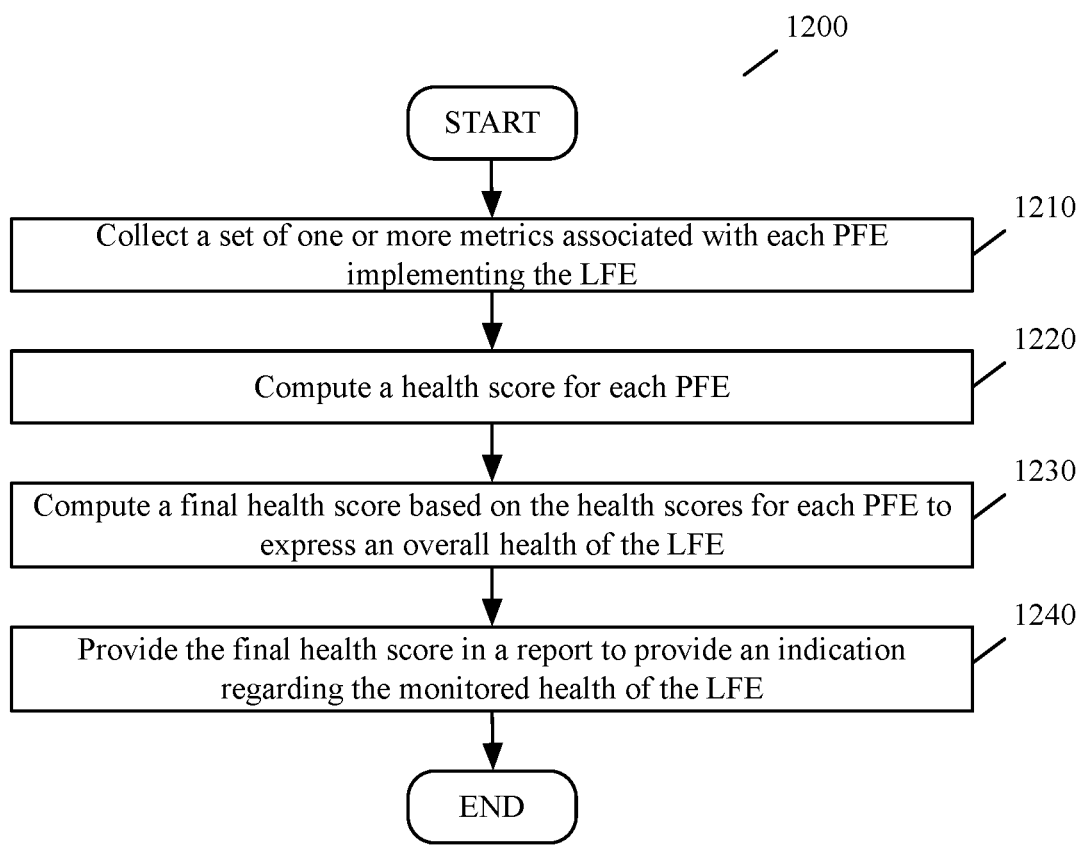
FIG. 12 conceptually illustrates a process of some embodiments for computing a health score for an LFE.

In some embodiments, the health analytics manager computes a health score for one LFE to provide to a user for monitoring the one LFE. FIG. 12 conceptually illustrates the process 1200 for computing a health score for one LFE. This process 1200 may be performed by the health analytics manager of an HMS similarly to computing a health score for a logical network. The process 1200 begins by collecting (at 1210) a set of one or more metrics associated with each PFE implementing the LFE. Like metrics for an entire logical network, these metrics can be collected by the health analytics manager from the TSDB of the HMS and/or from another database.

Next, the process 1200 computes (at 1220) a health score for each PFE implementing the LFE. The health analytics manager computes a secondary health score for each PFE in order to quantify the health of the PFEs individually. For each PFE, the health analytics manager computes normalized metric values for each of the PFE's metrics, and sums these values based on weights assigned to the metrics. For instance, for a particular PFE, the health analytics manager may compute normalized metric values of the particular PFE's metrics related to its latency, its number of packets processed per second, its connection status to other PFEs in the network, etc., to compute the health score for the PFE.

Then, the process 1200 computes (at 1230) a final health score for the LFE based on the health scores for each PFE to express an overall health of the LFE. Based on weights assigned to each PFE, the health analytics manager sums the secondary health scores for each PFE to compute the LFE's health score. In some embodiments, weights may not be assigned to PFEs and may only be assigned to individual metrics. In such embodiments, the health analytics manager computes the final health score using the normalized metric values and the weights for the individual metrics instead of using the secondary health scores of the PFEs. Alternatively, the health analytics manager can assume the weight for each PFE is the same (since the user did not assign more weight to one PFE over another), and sum the secondary health scores based on the same weight for each PFE. For example, if the LFE is implemented by 4 PFEs, and no weights were assigned to the PFEs by the user, the health analytics manager assumes each PFE has a weight of 0.25 to compute the final health score.

Once the final health score is computed, the process 1200 provides (at 1240) the final health score for the LFE in a report to provide an indication regarding the monitored health of the LFE. This report may include just the final health score, or may also include secondary health scores computed for PFEs, normalized metric values for individual metrics, and/or weights used in computing the health score. The process 1200 then ends.

Figure 13A:
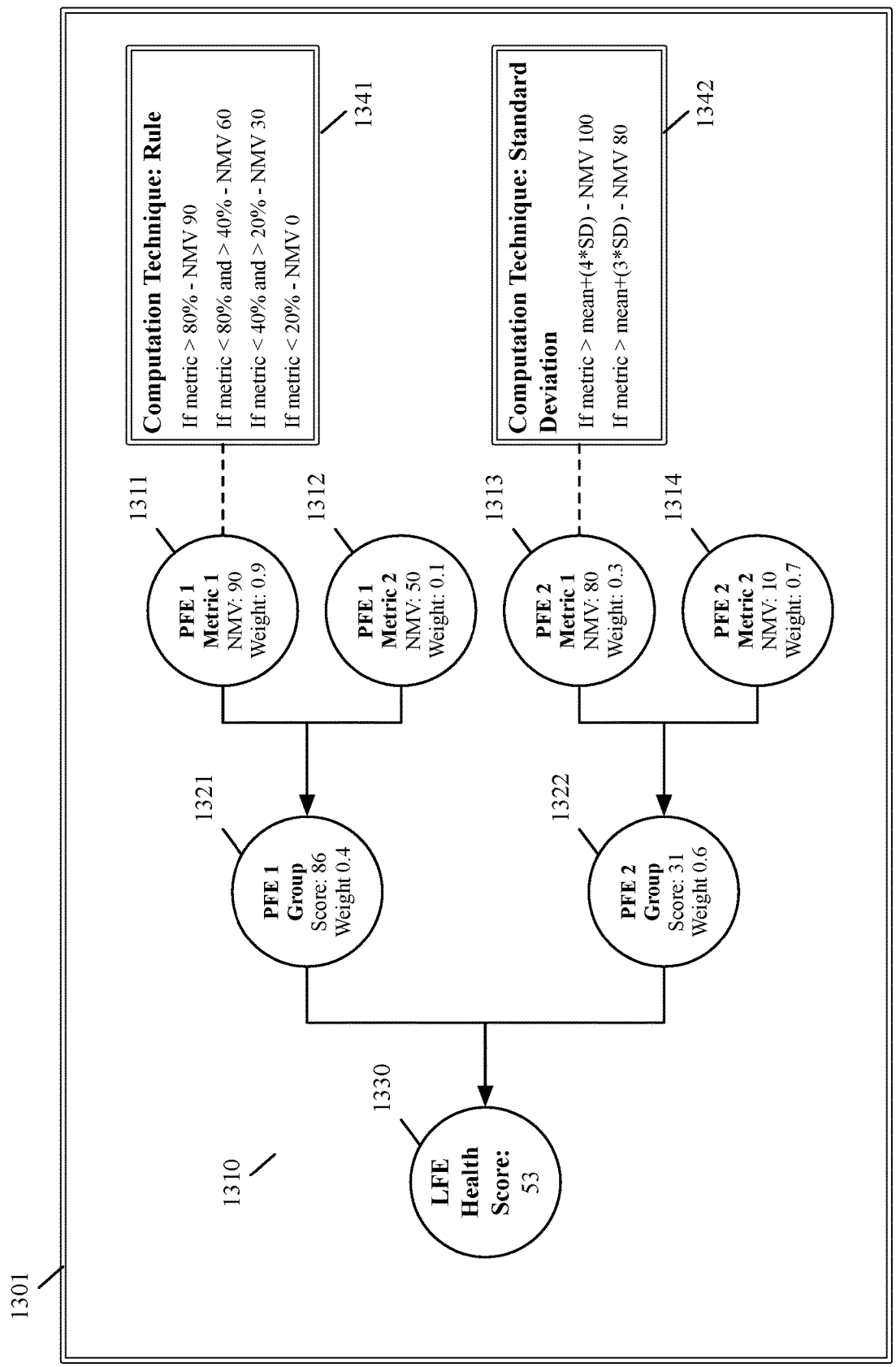
FIGS. 13A-D illustrate example UIs and information presented to a user regarding the health of a composite component.

In some embodiments, a report for a composite component (e.g., an LFE, a logical network, an SMN, etc.) is presented in a UI for a user to view the computation of the composite component's health score and for the user to monitor the health of the composite component. These reports may be presented for any component's health score computation, such as for a logical network, a logical subnetwork, an LFE, or an entire SMN. FIGS. 13A-D illustrate example UIs and information that can be presented to the user regarding health scores. FIG. 13A presents a UI 1301 with an example score tree 1310 for an LFE. The score tree 1310 is presented in the UI 1301 to illustrate the mapping between the individual metrics 1311-1314, the metric groups 1321-1322, and the final score 1330. For each individual metric, the score tree 1310 provides the name of the metric, the normalized metric value for that metric, and the weight assigned to the metric. PFE 1 Metric 1 1311 has a normalized metric value of 90 and a weight of 0.9. PFE 1 Metric 2 1312 has a normalized metric value of 50 and a weight of 0.1. PFE 2 Metric 1 1313 has a normalized metric value of 80 and a weight of 0.3. PFE 2 Metric 2 1314 has a normalized metric value of 10 and a weight of 0.7. Arrows from the metrics 1311-1314 indicate which metric group 1321-1322 the metric belongs. PFE 1's metrics 1311-1312 are part of PFE 1 Group 1321, and PFE 2's metrics 1313-1314 are part of PFE 2 Group 1322. These two metric groups 1321-1322 have computed health scores and weights, which are used to compute the LFE's final health score 1330 of 53.

UIs in some embodiments provide further information related to the computation of the health scores, the metrics used in the health score computation, and the impact of the health score. The UI 1301 presents the windows 1341 and 1342 to provide further information to the user regarding how normalized metric values are computed. These windows 1341 and 1342 may be provided for each metric shown in the UI 1301, or may only be provided for a subset of the metrics. In this example, the windows 1341 and 1342 are presented for two of the metrics 1311 and 1313, respectively. The first window 1341 for PFE 1 Metric 1 1311 describes that this metric's normalized metric value was computed using a rule-based technique. In computing the normalized metric value for this metric 1311, the health analytics manager used the following rules: (1) if the metric is more than 80%, the normalized metric value is 90; (2) if the metric is between 40% and 80%, the normalized metric value is 60; (3) if the metric is between 20% and 40%, the normalized metric value is 30; and (4) if the metric is less than 20%, the normalized metric value is 0. The second window 1342 for PFE 2 Metric 1 1313 describes that this metric's normalized metric value was computed using a standard deviation technique. In computing the normalized metric value for this metric 1313, the health analytics manager used the following computations: (1) if the measured metric is more than the mean (i.e., average) of this metric plus 4 times the standard deviation of this metric, the normalized metric value is 100; and (2) if the measured metric is more than the mean of this metric plus 3 times the standard deviation of this metric, the normalized metric value is 80. In some embodiments, the windows 1341 and 1342 are shown in the UI along with the score tree 1310. In other embodiments, the windows 1341 and 1342 are only shown in the UI 1301 upon receiving a selection from the user to view this information.

Figure 13B:
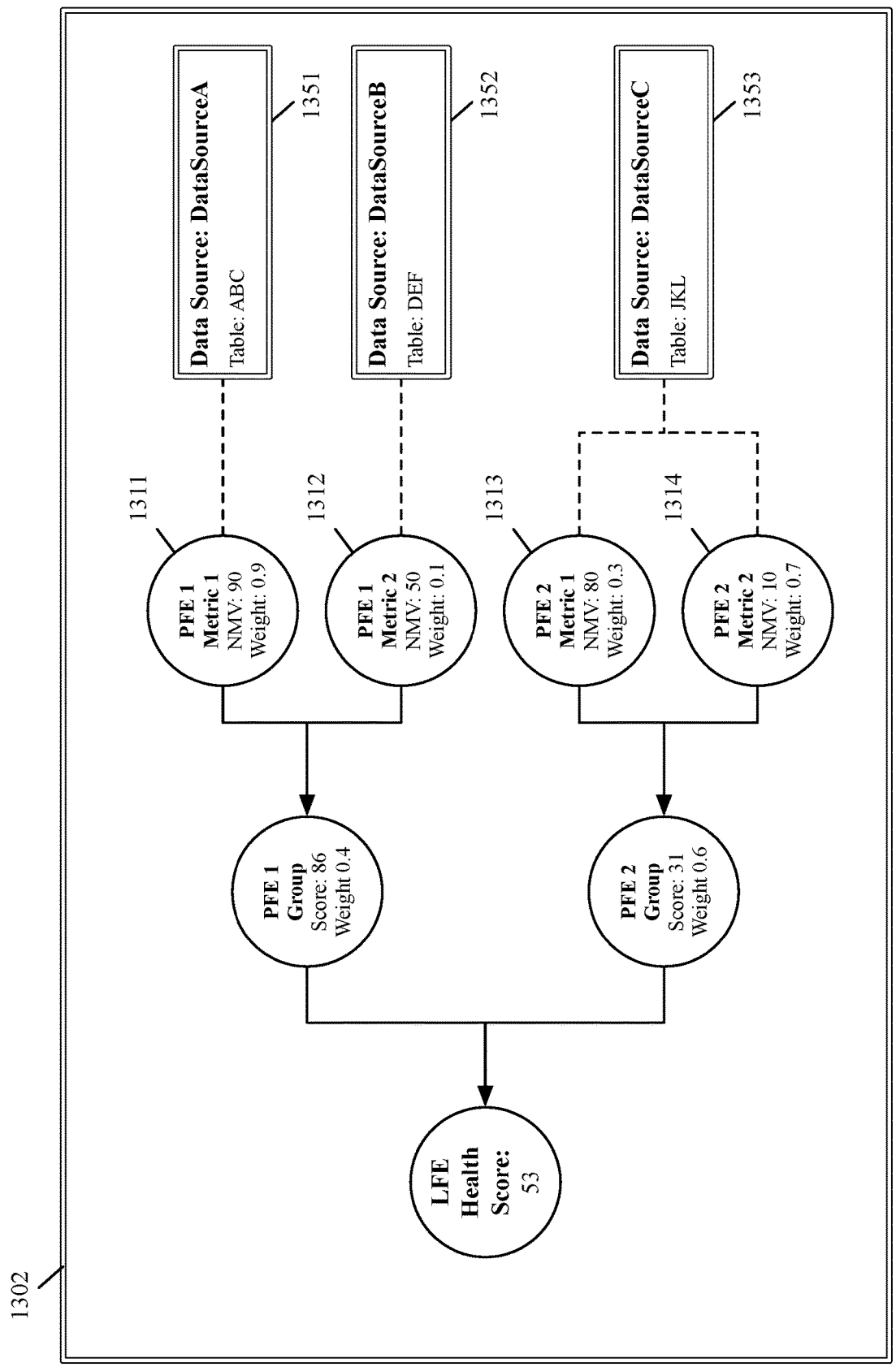

FIG. 13B illustrates a similar example UI 1302, with windows 1351-1353 to display information regarding which datasource from which each metric was collected. In some embodiments, all metrics are collected from a TSDB of the HMS. In other embodiments, different metrics are collected from different data stores in the network, such as from databases on hosts from which the metrics are measured and collected. In this example UI 1302, the first window 1351 describes that PFE 1 Metric 1 1311 was collected from a table ABC in a database DataSourceA. The second window 1352 describes that PFE 1 Metric 2 1312 was collected from a table DEF in a database DataSourceB. The third window 1353 describes that PFE 2 Metric 1 1313 and PFE 2 Metric 2 1314 were both collected from a table JKL in a database DataSourceC. In some embodiments, these windows 1351-1353 provide further information regarding the data source from which each metric was collected, such as which component/host on which the data source operates.

Figure 13C:
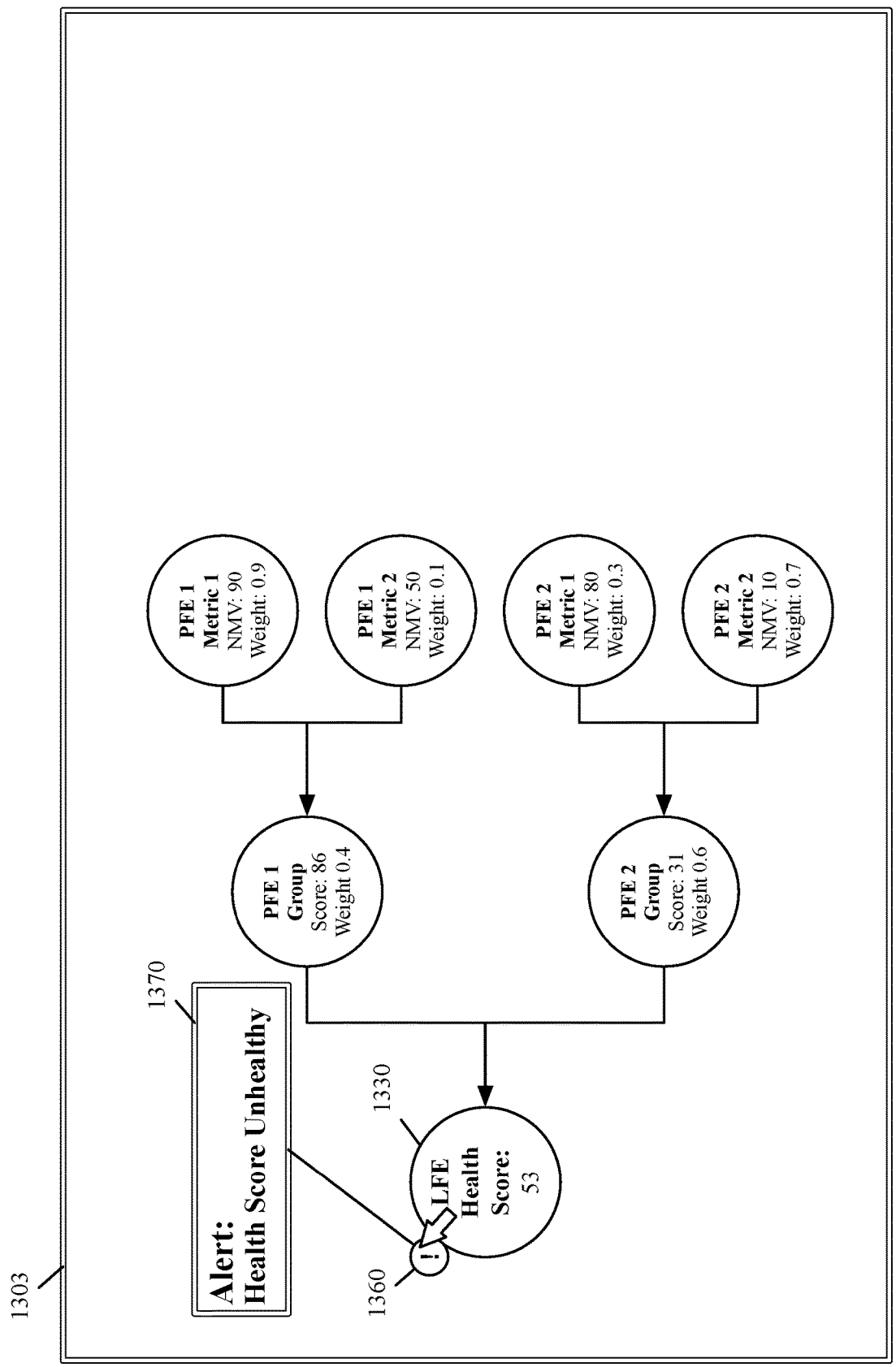

FIG. 13C illustrates another example UI 1303 that provides alerts related to the computed health score for the composite component. In some embodiments, when a component's health score falls below a particular threshold, the health analytics manager sends a notification to the user that the component is at risk. This notification may be in the form of a text message, an email, an alert in a UI, etc. In embodiments where anomaly scores are computed for components, the notification is sent when the anomaly score reaches a particular threshold. In the example of FIG. 13C, the LFE's final health score 1330 is valued at 53. In some embodiments, a component is considered "at risk" if the health score is above 40 and below 79, and "unhealthy" if the health score is below 40. Because the LFE's health score was computed to be 53, the UI 1303 presents an icon 1360 next to the LFE health score 1330 to notify the user of a possible problem with the LFE. In some embodiments, upon selection of this icon 1360, the UI 1303 presents a window 1370 to alert the user of the at-risk/unhealthy component. In other embodiments, the window 1370 is presented in the UI 1303 without any user selection. The window 1370 of some embodiments also includes information regarding (1) a potential problem associated with the health score, (2) a potential impact the health score may have on the component, and (3) a recommended action to improve the health score. For example, for a final health score of 30 out of 100 for an LFE, the report may provide information regarding potential problems that may arise when the health score is this low, the impact on the LFE this score may have, and recommended actions to improve the health of the LFE. A recommended action may include reducing the amount of storage at a particular PFE implementing the LFE, if a storage usage metric for that PFE has a poor health score.

Figure 13D:
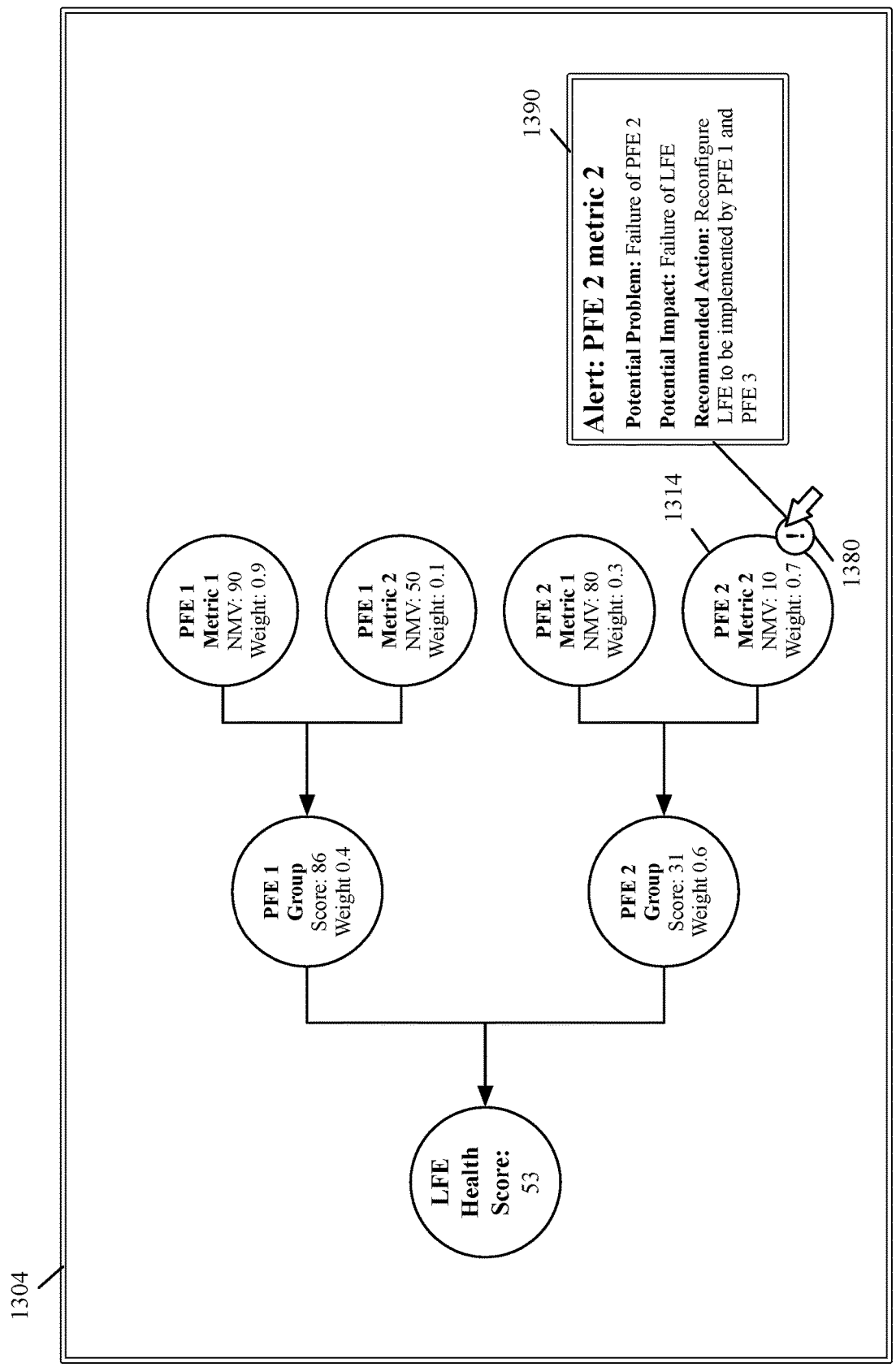

FIG. 13D illustrates a similar UI 1304 to display alerts regarding the normalized metric values of individual metrics. In this example, PFE 2 Metric 2 1314 has an alert icon 1380 to indicate to the user that there is a potential problem with this metric and/or with the component from which this metric was collected (i.e., PFE 2). The window 1390 presents the user with more detailed information regarding the alert of PFE 2 and the impact the metric has on the health of the entire LFE. In some embodiments, the window 1390 presents, to the user, (1) a potential problem that can arise if this metric does not improve, (2) a potential impact this metric may have on the composite component (e.g., the LFE) if not improved, and (3) a recommended action to improve the metric. For example, if a number of data messages processed per second metric for a particular PFE is measured to be low (e.g., 10 data messages processed per second, instead of an average of 100 data messages per second), the normalized metric value for that metric will be low. The health analytics manager may alert the user of this low metric using an alert through a UI, and provide recommended actions to either improve the metric or to reconfigure the LFE such that it is not dependent on the particular PFE. For the metric 1314, the window 1390 identifies that (1) the potential problem is failure of PFE 2, (2) the potential impact is failure of the LFE, and (3) a recommended action is reconfiguring the LFE to be implemented by PFE 1 and PFE 3 instead of PFE 1 and PFE 2. In some embodiments, these alerts and information are displayed for any normalized metric values, secondary health scores, and final health scores presented in the UI 1304.

Figure 14:
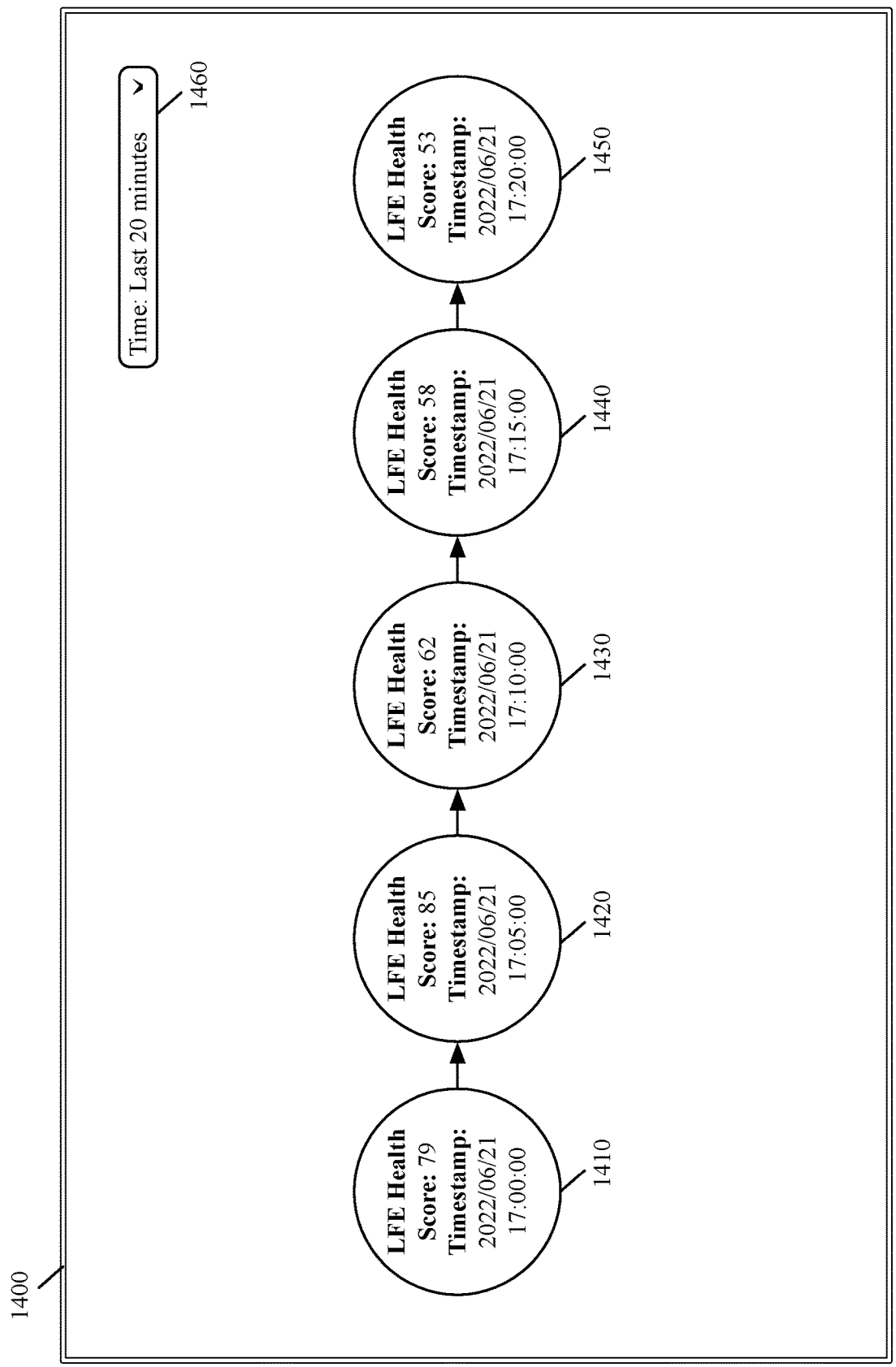
FIG. 14 illustrates an example UI to view a particular LFE's health over a period of time.

In some embodiments, a user utilizes a UI to view the health of a composite component over time. A user may call an API to the HMS to view health scores of a component over a specified period of time. FIG. 14 illustrates a UI 1400 to view a particular LFE's health over time. In some embodiments, an HMS stores all computed health scores for one component such that the health analytics manager of the HMS can present a historical view of the health scores in a UI. In this example, the UI 1400 displays five health scores 1410-1450 computed for one LFE. Each health score is presented along with a timestamp identifying the time at which the health analytics manager computed that health score. In some embodiments, the UI 1400 also provides the user with a filter 1460 to select a period of time for which to view health scores. In this example, the user has selected to view health scores computed for the LFE within the last 20 minutes.

Figure 15:
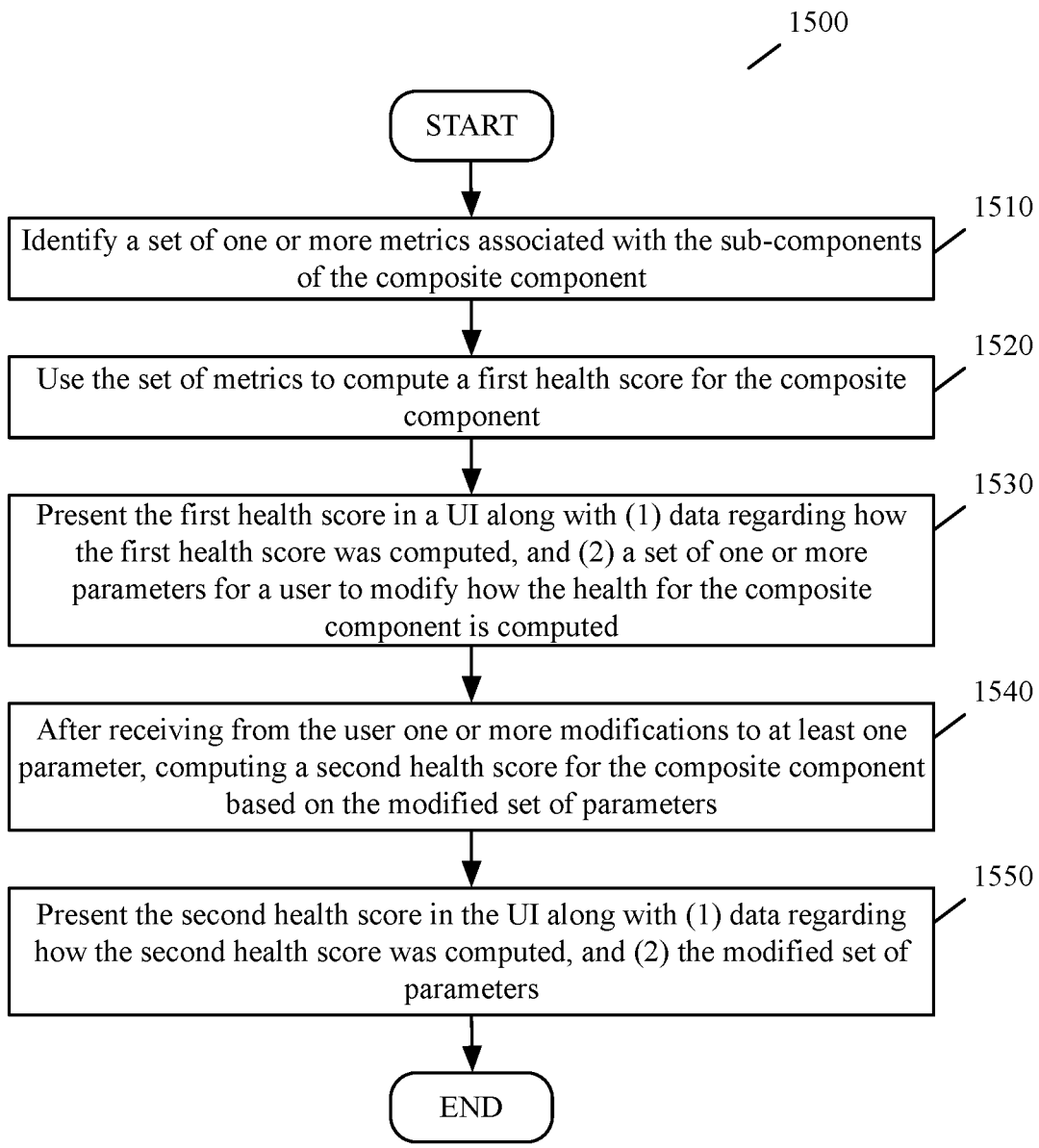
FIG. 15 conceptually illustrates a process of some embodiments for monitoring the health of a composite component and modifying the computation of the composite component's health score.

As discussed above, a UI may present to a user a composite component's health score and information regarding the computation of the health score. In some embodiments, the UI also provides the user with configurable parameters for modifying how the health score for a composite component is computed. FIG. 15 conceptually illustrates a process 1500 for monitoring the health of a composite component and modifying the computation of the composite component's health score. This process 1500 may be performed by a health analytics manager of an HMS, such as the health analytics manager 640 of FIG. 6, or may be performed by any suitable application or module. The process 1500 may be performed for health scores of any composite component, such as an SMN, a logical network or sub-network, or an LFE.

The process 1500 begins by identifying (at 1510) a set of one or more metrics associated with the sub-components of the composite component. The health analytics manager may identify these metrics from the TSDB of the HMS, or may identify them from any other data source. Next, the process 1500 uses (at 1520) the set of metrics to compute a first health score for the composite component. The health analytics manager may compute the first health score using the process 700 of FIG. 7, i.e., by computing normalized metric values and secondary health scores to compute the final health score (i.e., the first health score) for the component.

Next, the process 1500 presents (at 1530) the first health score in a UI along with (1) data regarding how the first health score was computed, and (2) a set of one or more parameters for a user to modify how the health for the composite component is computed. This information may be provided in a list, in a mapping or score tree, or in any suitable format. The health analytics manager provides this to a user in a UI for the user to view how the first health score was computed, and to modify any parameters used in computing the first health score. For example, the UI can display the weights used in the health score computation, and the UI can provide the user with parameters to modify the weights for future health score computations. The UI can also display a list of the metrics used in computing the first health score, and the UI can provide the user with parameters to modify which metrics are included in the health score computation (e.g., adding or removing metrics from the computation). The UI may also provide parameters to modify the list of components considered for computing the health score. For example, the user can use the parameters to add or remove (1) components from an SMN health score computation (e.g., particular hosts, PFEs, etc.), (2) components from a logical network health score computation (e.g., particular logical switches, routers, gateways, etc.), and (3) components from an LFE health score computation (e.g., particular PFEs). Further information regarding the information displayed in the UI and the parameters will be described below.

After receiving from the user one or more modifications to at least one parameter, the process 1500 computes (at 1540) a second health score composite component based on the modified set of parameters. Upon reception of at least one modification to the set of parameters, the health analytics manager updates the parameters used in computing the composite component's health score and computes the second health score using those updated parameters. For instance, if the user modifies the weights assigned to the metrics, the health analytics manager computes the second health score using the new weights provided by the user. In some embodiments, the second health score is computed based on the same set of metrics used to compute the first health score. In other embodiments, the second health score is computed based on a different set of metrics. For example, if the HMS receives newly collected metrics from metrics collectors in the SMN after computing the first health score, the health analytics manager can use the new metrics to compute the second health score in order to better indicate the current health of the composite component.

Then, the process 1500 presents (at 1550) the second health score in the UI along with (1) data regarding how the second health score was computed, and (2) the modified set of parameters. The health analytics manager updates, in the UI, any parameters that the user modified to reflect the new parameters used in computing the second health score. The process 1500 then ends.

A user in some embodiments can use the UI to modify a variety of parameters used in computing the health score of a composite component. In some embodiments, all parameters used in computing a component's health score is able to be modified by the user. In other embodiments, only a subset of the parameters are able to be modified by the user. The parameters to be modified by the user can include any parameters related to a health score computation, such as (1) the weights used in the computation, (2) the techniques used to compute normalized metric values and health scores, (3) the metrics included in the computation, (4) the time interval at which the health score is periodically computed, (5) the threshold used to determine when the component is at risk and when to notify the user of a potential problem, etc.

Figure 16A:
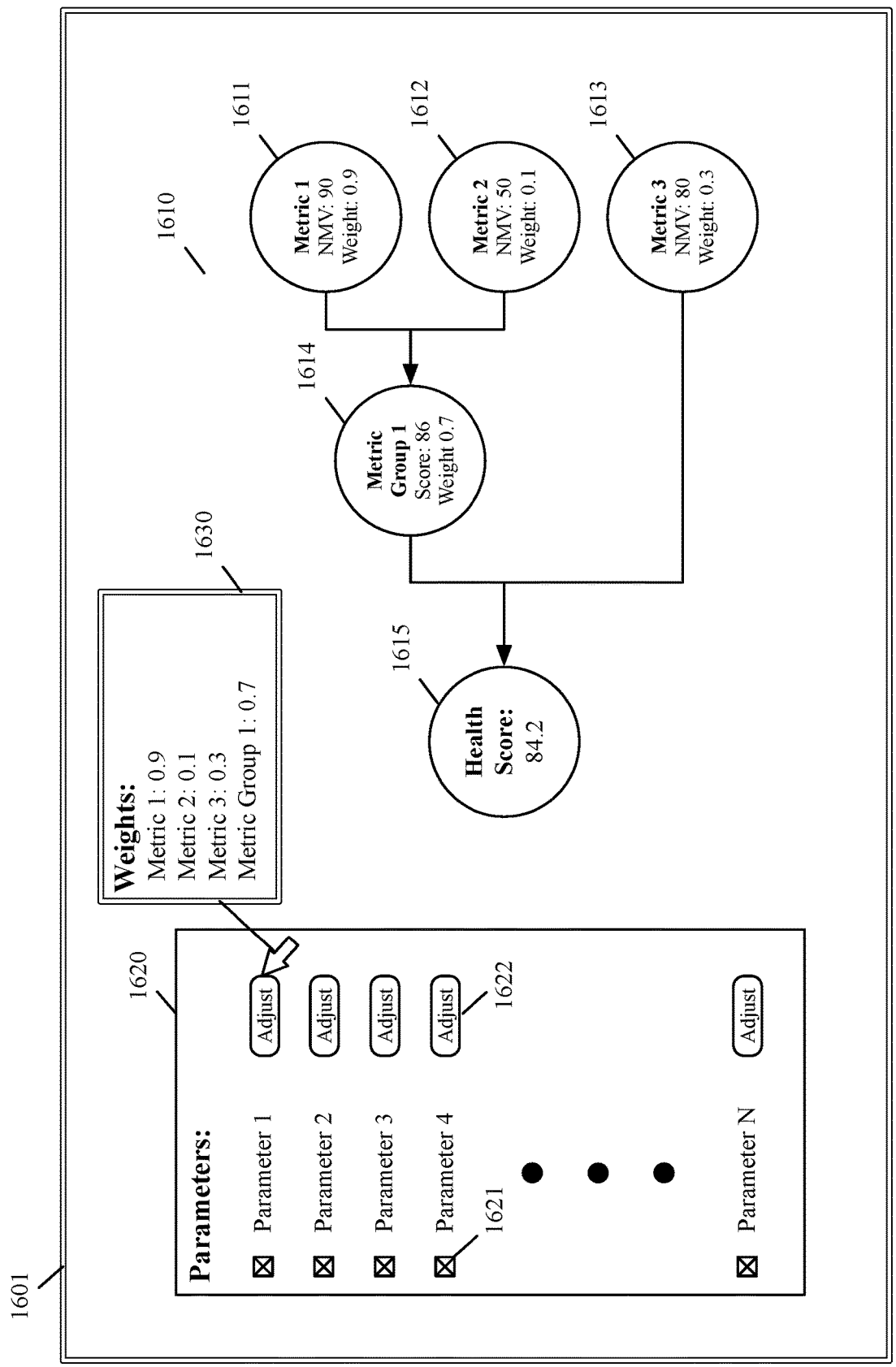
FIGS. 16A-B illustrate example UIs for modifying weights used in a health score computation.
Figure 16B:
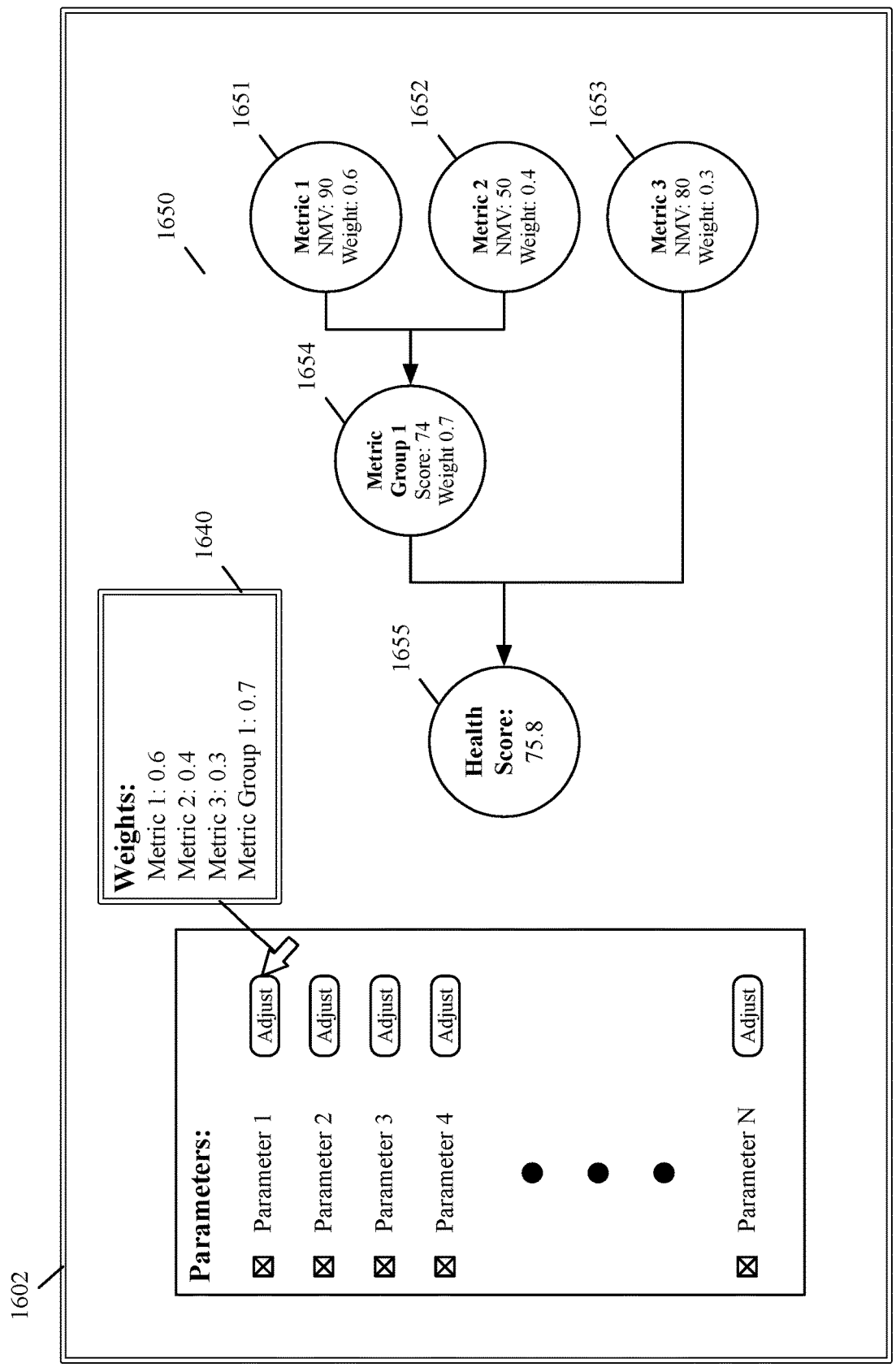

FIGS. 16A-B illustrate example UIs for modifying the weights used in the health score computation. In the example of FIG. 16A, the UI 1601 presents to the user a score tree 1610, with metric nodes 1611-1613, a metric group 1614, and a final health score 1615. The first metric node 1611 has a computed normalized metric value of 90 and an assigned weight of 0.9. The second metric node 1612 has a computed normalized metric value of 50 and an assigned weight of 0.1. The third metric node 1613 has a computed normalized metric value of 80 and an assigned weight of 0.3. The metric group 1614, which includes metrics 1611 and 1612, has a computed health score of 86 and an assigned weight of 0.7. The component's final health score, using the metric group 1614's health score and the third metric 1613's normalized metric value, has a computed value of 84.2.

Along with the score tree 1610, the UI 1601 also presents a list of parameters 1620 used in some embodiments for computing the component's health score. The UI 1601 may display any number of parameters 1-N used in computing health scores. For each parameter listed, a selectable item 1621 is presented, such that that user can control whether the parameter is included in the health score computation. For example, the list of parameters 1620 may list a parameter for creating and eliminating metric groups. When the selectable item 1621 for this parameter is selected (as denoted by an "X"), the health score computation will include any metric groups created by the user. When the selectable item 1621 is not selected (as denoted by an empty box), the health score will not be computed with any metric groups, meaning that the final health score will be computed based on the normalized metric values for all metrics based on their weights.

In some embodiments, the list of parameters 1620 also includes an "adjust" option 1622, for the user to adjust/modify any of the listed parameters 1620. Upon selection of a particular adjust option 1621, the UI 1601 displays a window 1630 to present the user with the details of the selected parameter and for the user to modify those parameters. In the example of UI 1601, the user has selected the weights parameter, and the window 1630 lists the weights assigned to the metrics 1611-1613 and to the metric group 1614. The user uses this window 1630 to change any of these weights.

FIG. 16B illustrates a UI 1602 after receiving a modification of the weights from the user. the window 1640 displaying the assigned weights now lists the updated weights provided by the user. After receiving an update of the weights from the user, the health analytics manager recomputes the health score using the updated weights and presents the new computation in the score tree 1650. The user has changed the weights assigned to Metric 1 1651 (from 0.9 to 0.6) and Metric #2 (from 0.1 to 0.4), which changes the secondary health score for Metric Group 1 1654 from 86 to 74, and the final health score 1655 from 84.2 to 75.8. The weight for Metric 3 1653 is unchanged, so this metric did not affect the updated health score 1655 differently than the previously computed health score.

Figure 17A:
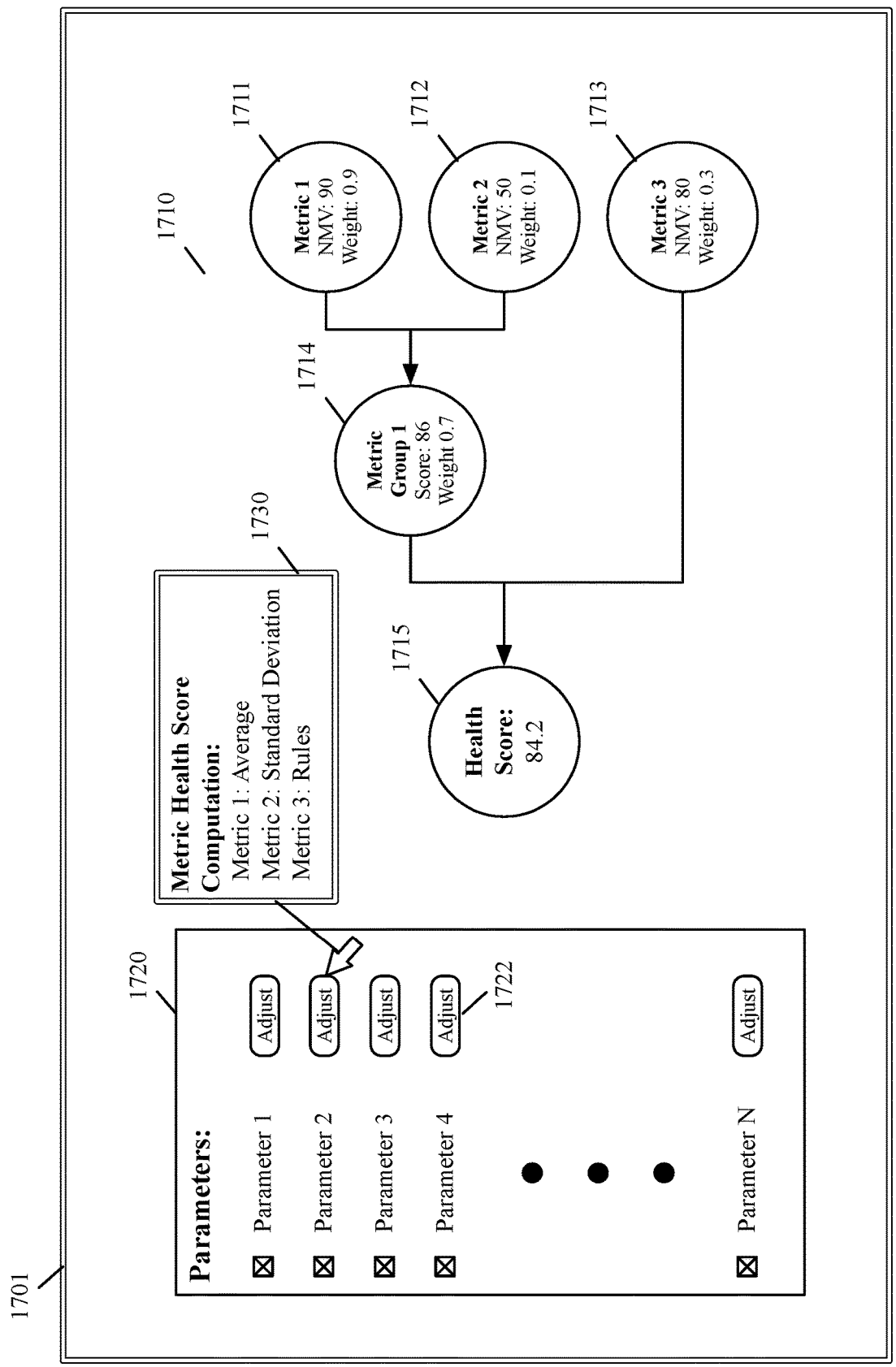
FIGS. 17A-B illustrate example UIs for modifying techniques used in normalized metric value computation.
Figure 17B:
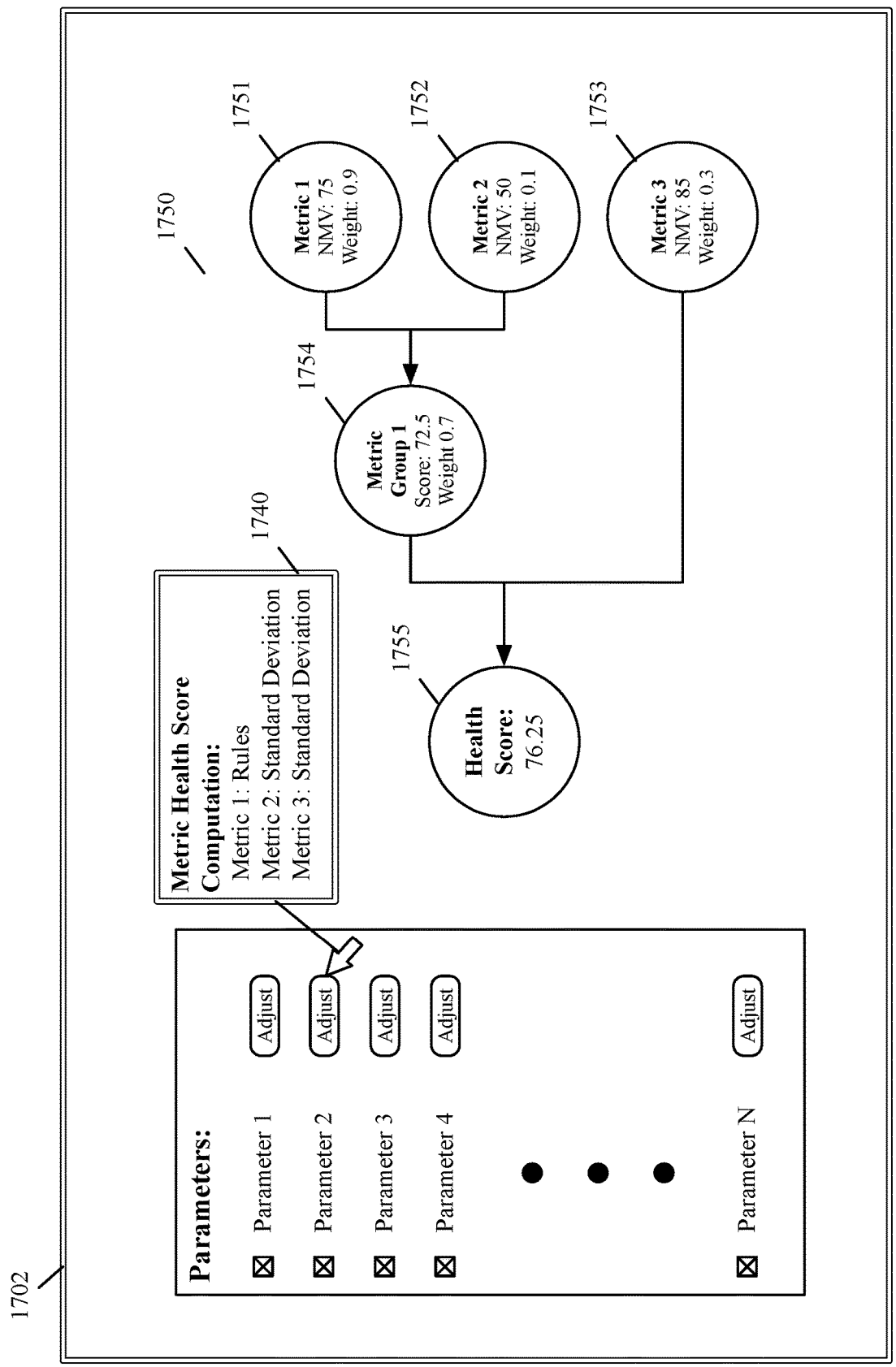

FIGS. 17A-B illustrate example UIs for modifying the techniques used in computing normalized metric values. FIG. 17A illustrates a UI 1701, with a score tree 1710 of metric nodes 1711-1713, a metric group node 1714, and a final health score 1715. Metric 1711 has a computed normalized metric value of 90 and an assigned weight of 0.9. Metric 2 1712 has a computed normalized metric value of 50 and an assigned weight of 0.1. Metric 3 1713 has a computed normalized metric value of 80 and an assigned weight of 0.3. Metric Group 1 1714 has a computed health score of 86 and an assigned weight of 0.7. The final health score 1715 is computed to be a value of 84.2. In this example, a user has used the list of parameters 1720 and an adjust button 1722 of a parameter defining which technique is used in computing normalized metric values for each metric. The window 1730 displays the information regarding which technique was used for each of the three metrics, and lets the user modify which technique is used for each metric. In this example, Metric 1 1711 is associated with an averaging technique, which computes the metric's normalized metric value by dividing the collected metric by the metric's maximum value. Metric 2 1712 is associated with a standard deviation technique, which computes the metric's normalized metric values based on the metric's standard deviation. Metric 3 1713 is associated with a rules technique, which generates the metric's normalized metric value based on defined rules.

In some embodiments, the user can use the window 1730 to modify which technique is used for which metric. For example, Metric 1 1711 is listed to use an averaging technique. The window 1730 may let the user change Metric 1 1711's associated technique from the averaging technique to a rule technique. In some embodiments, the window 1730 also lets the user modify the specifics of each technique. For example, Metric 3 1713 is listed to use a rules technique, and the window 1730 may provide the user with the ability to modify the specific rules used in computing Metric 3 1713's normalized metric value.

FIG. 17B illustrates a UI 1702 after the user has modified these techniques. The window 1740 now lists Metric 1 1751 as being associated with a rules technique, and Metric 3 1753 as being associated with a standard deviation technique. The technique and the normalized metric value for Metric 2 1752 remains unchanged, meaning that the user did not modify this metric's parameter. After receiving the updated techniques, the health analytics manager recomputes the component's health score and displays the updated score tree 1750. The score tree 1750 now displays Metric 1 1751's normalized metric value as 75 (from 90), Metric 3 1753's normalized metric value as 85 (from 80), Metric Group 1 1754's health score as 72.5 (from 86), and the final health score 1755 as 76.25 (from 84.2). By changing the technique parameters, the final health score for the component has dropped, which the user can view using the UI 1702.

Figure 18A:
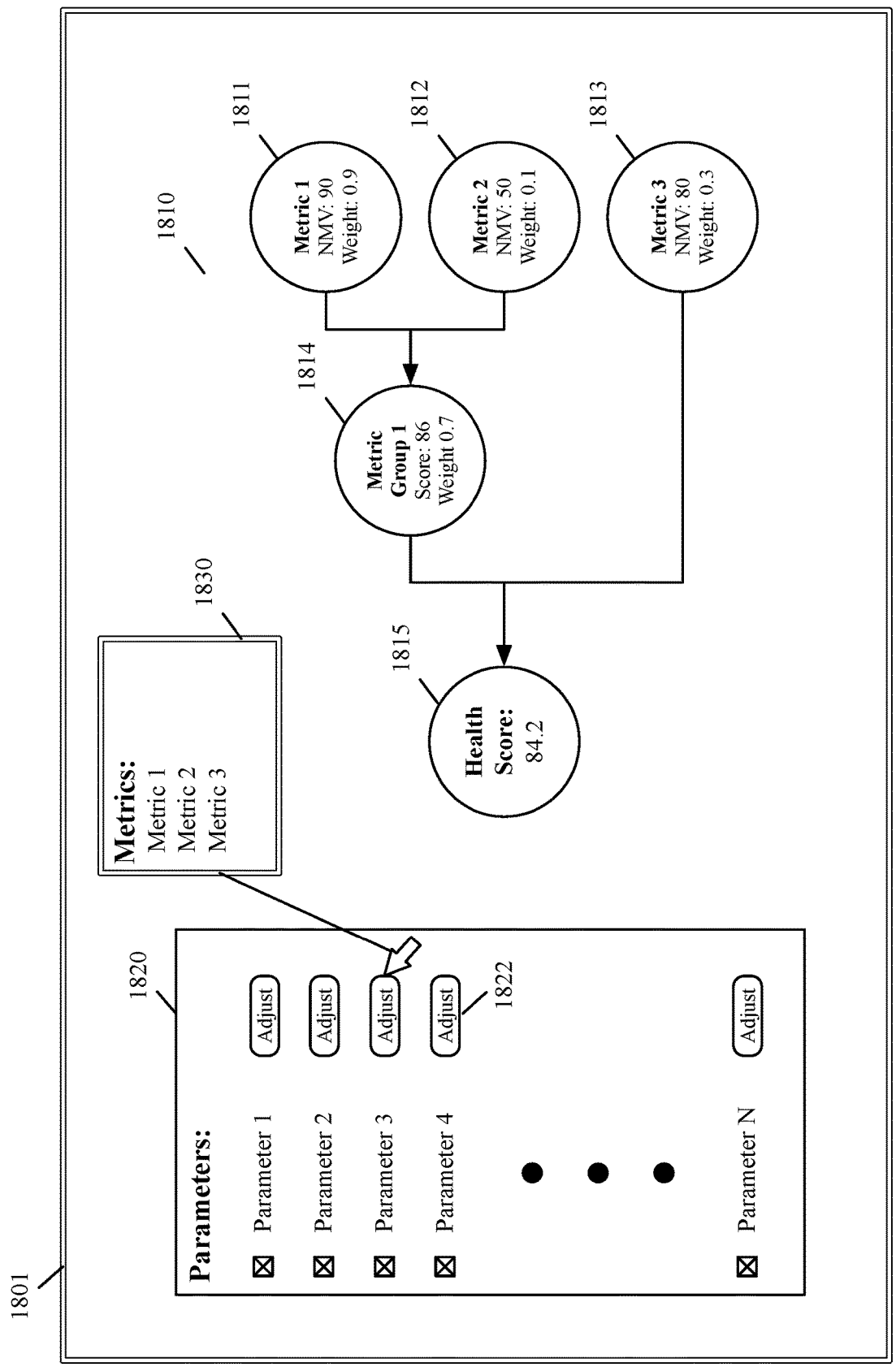
FIGS. 18A-B illustrate example UIs for modifying which metrics are included in a health score computation.
Figure 18B:
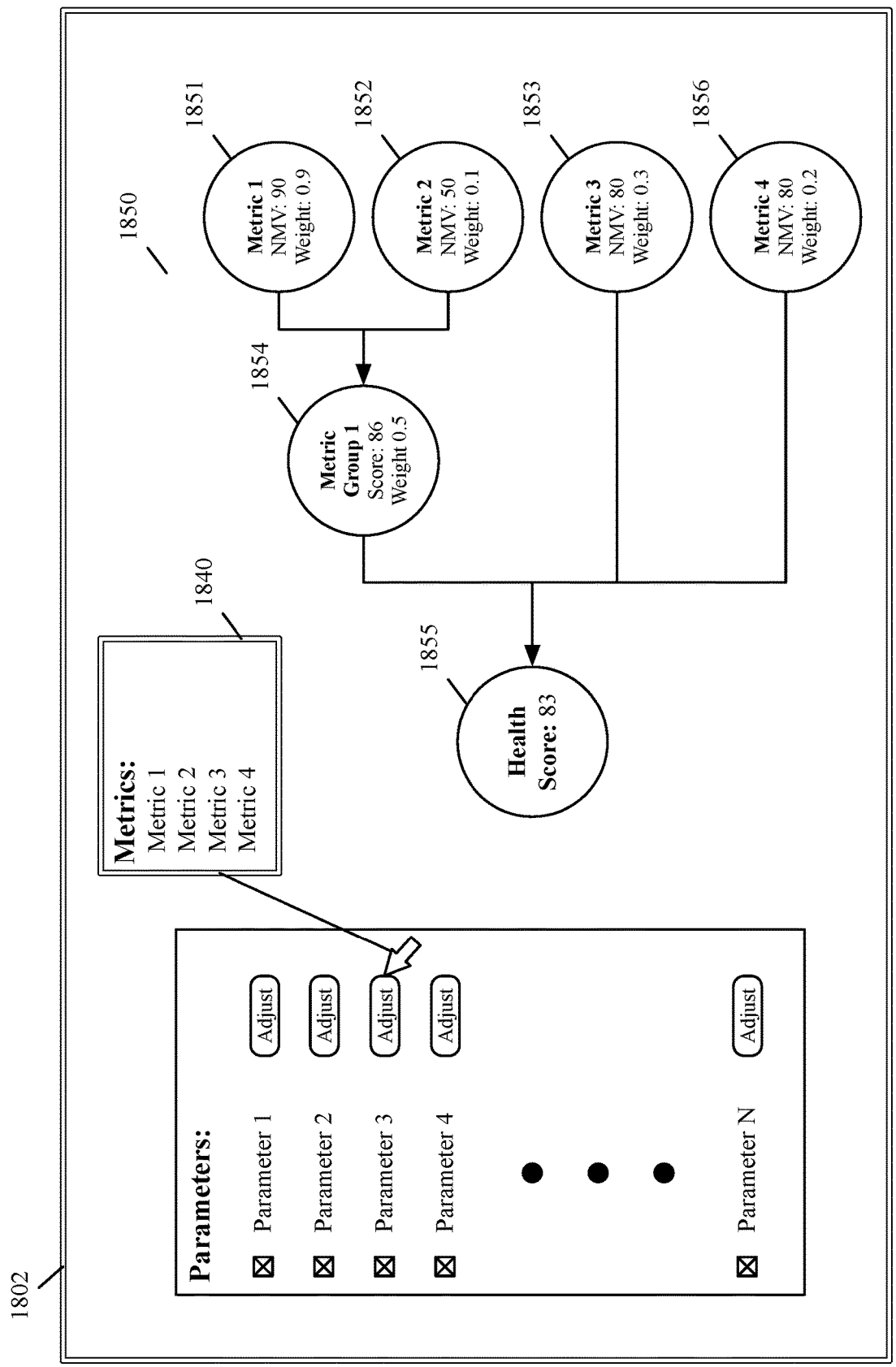

FIGS. 18A-B illustrate example UIs for modifying which metrics are included in a health score computation. FIG. 18A illustrates a UI 1801, which displays the score tree 1810 and the list of parameters 1820. The score tree 1810 includes three metric nodes 1811-1813, one metric group node 1814, and the final health score 1815. In this example, the user has used the list of parameters 1820 and an adjust button 1822 of a parameter defining which metrics are included in the health score computation. The window 1830 displays the list of metrics used in computing the component's health score, and the user may use this window 1830 to modify this list of metrics. For instance, the user can add metrics to or remove metrics from the health score computation. For example, for a logical network health score computation, if an LFE is removed from the logical network, the user can use this window 1830 to remove the metrics associated with that LFE so that the logical network's health score is not affected by metrics of the removed LFE. If a new LFE is added to the logical network, the user can use this window 1830 to add metrics associated with the new LFE so that the health of the new LFE is reflected in the final health score.

FIG. 18B illustrates a UI 1802 after the user has modified the list of metrics. The window 1840 now lists four metrics, indicating that the user added a new fourth metric to the health score computation. After receiving this modification, the health analytics manager computes the health score for the component using the new list of metrics and displays the updated score tree 1850. The first three metrics 1851-1853 and Metric Group 1 1854 remain unchanged. A new fourth metric 1856 is added to the health score computation, with a normalized metric value of 80 and an assigned weight of 0.2. As a result of this new metric 1856, the final health score 1855 has changed from 84.2 to 83.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 19:
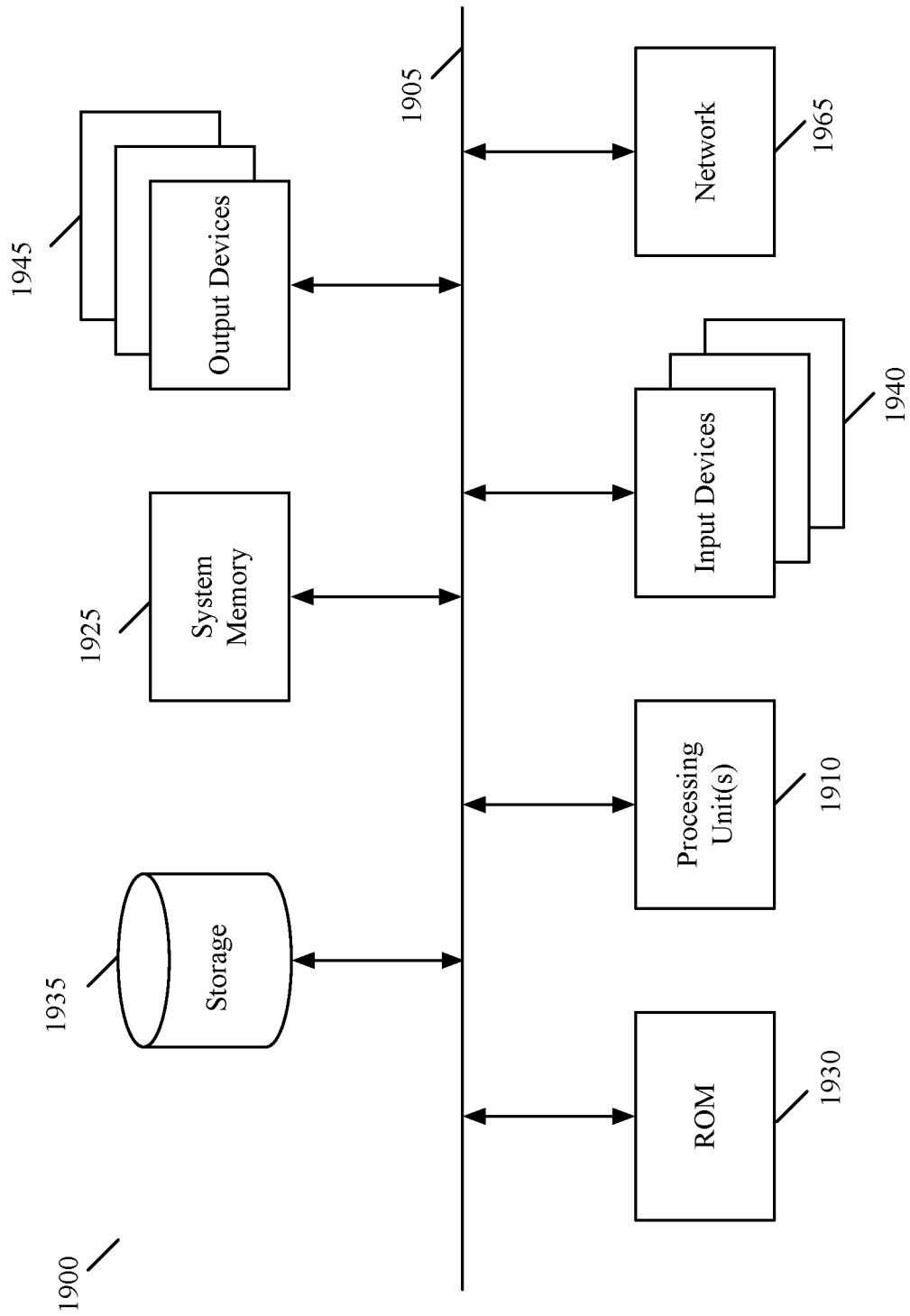
FIG. 19 conceptually illustrates an electronic system with which some embodiments of the invention are implemented.

FIG. 19 conceptually illustrates a computer system 1900 with which some embodiments of the invention are implemented. The computer system 1900 can be used to implement any of the above-described computers and servers. As such, it can be used to execute any of the above described processes. This computer system includes various types of non-transitory machine readable media and interfaces for various other types of machine readable media. Computer system 1900 includes a bus 1905, processing unit(s) 1910, a system memory 1925, a read-only memory 1930, a permanent storage device 1935, input devices 1940, and output devices 1945.

The bus 1905 collectively represents all system, peripheral, and chipset buses that communicatively connect the numerous internal devices of the computer system 1900. For instance, the bus 1905 communicatively connects the processing unit(s) 1910 with the read-only memory 1930, the system memory 1925, and the permanent storage device 1935.

From these various memory units, the processing unit(s) 1910 retrieve instructions to execute and data to process in order to execute the processes of the invention. The processing unit(s) may be a single processor or a multi-core processor in different embodiments. The read-only-memory (ROM) 1930 stores static data and instructions that are needed by the processing unit(s) 1910 and other modules of the computer system. The permanent storage device 1935, on the other hand, is a read-and-write memory device. This device is a non-volatile memory unit that stores instructions and data even when the computer system 1900 is off. Some embodiments of the invention use a mass-storage device (such as a magnetic or optical disk and its corresponding disk drive) as the permanent storage device 1935.

Other embodiments use a removable storage device (such as a flash drive, etc.) as the permanent storage device. Like the permanent storage device 1935, the system memory 1925 is a read-and-write memory device. However, unlike storage device 1935, the system memory is a volatile read-and-write memory, such a random access memory. The system memory stores some of the instructions and data that the processor needs at runtime. In some embodiments, the invention's processes are stored in the system memory 1925, the permanent storage device 1935, and/or the read-only memory 1930. From these various memory units, the processing unit(s) 1910 retrieve instructions to execute and data to process in order to execute the processes of some embodiments.

The bus 1905 also connects to the input and output devices 1940 and 1945. The input devices enable the user to communicate information and select commands to the computer system. The input devices 1940 include alphanumeric keyboards and pointing devices (also called "cursor control devices"). The output devices 1945 display images generated by the computer system. The output devices include printers and display devices, such as cathode ray tubes (CRT) or liquid crystal displays (LCD). Some embodiments include devices such as a touchscreen that function as both input and output devices.

Finally, as shown in FIG. 19, bus 1905 also couples computer system 1900 to a network 1965 through a network adapter (not shown). In this manner, the computer can be a part of a network of computers (such as a local area network ("LAN"), a wide area network ("WAN"), or an Intranet, or a network of networks, such as the Internet. Any or all components of computer system 1900 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, and any other optical or magnetic media. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. In addition, a number of the figures (including FIGS. 5, 7, 8, 11, 12, and 15) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

The invention claimed is:

1. A method for monitoring a health of a software managed network (SMN) comprising a plurality of network components, the method comprising:
    identifying a set of one or more metrics associated with the plurality of network components;
    using the set of metrics to compute a first health score for the SMN by computing a normalized metric value for each metric in the set of one or more metrics, and computing the first health score based on the normalized metric values for each metric in the set of one or more metrics and weights assigned to each metric;
    presenting the first health score in a user interface (UI) along with (i) data regarding how the first health score was computed, and (ii) a set of one or more parameters for a user to modify how the health of the SMN is computed; and
    after receiving from the user one or more modifications to at least one parameter in the set of parameters, computing a second health score for the SMN based on the modified set of parameters.

2. The method of claim 1, wherein the data presented in the UI comprises the first health score and the normalized metric values.

3. The method of claim 2, wherein the normalized metric values are computed based on rules and thresholds defined by the user through the UI, and the data presented in the UI further comprises the rules and thresholds.

4. The method of claim 3, wherein:
    the one or more modifications to at least one parameter comprises at least one modification to the rules and thresholds, and
    computing the second health score comprises:
        computing an updated normalized metric value for each metric in the set of one or more metrics based on the at least one modification to the rules and thresholds;
        computing the second health score based on the updated normalized metric values for each metric and the weights assigned to each metric; and
        presenting the updated normalized metric values and the second health score in the UI.

5. The method of claim 2, wherein the data presented in the UI further comprises the weights.

6. The method of claim 5, wherein:
    the one or more modifications to at least one parameter comprises at least one modification to at least one of the weights, and
    computing the second health score comprises:
        computing the second health score based on the normalized metric values for each metric and updated weights, wherein the updated weights are based on the at least one modification to the weights; and
        presenting the normalized metric values for each metric, the updated weights, and the second health score in the UI.

7. The method of claim 1, wherein:
    the one or more modifications to at least one parameter comprises at least one modification to which metrics associated with the SMN are included in the set of one or more metrics, and computing the second health score comprises:

computing the second health score for the SMN based on the at least one modification to which metrics associated with the SMN are included in the set of metrics; and presenting the second health score in the UI.

8. The method of claim 7, wherein the at least one modification to which metrics associated with the SMN are included in the set of one or more metrics comprises a modification to not include a subset of metrics in the set of one or more metrics for computing the second health score.

9. The method of claim 8, wherein the subset of metrics comprises metrics associated with a particular network component of the SMN, such that the second health score is computed without using any metrics associated with the particular network component.

10. The method of claim 8, wherein the subset of metrics comprises metrics of a particular type, such that the second health score is computed without using any metrics of the particular type.

11. The method of claim 7, wherein the set of one or more metrics is a first set of metrics, and the at least one modification to which metrics associated with the SMN are included in the set of metrics comprises a modification to include a second set of one or more metrics along with the first set of one or more metrics for computing the second health score.

12. The method of claim 11, wherein the second set of metrics comprises metrics associated with a particular network component that was added to the SMN after the first health score was computed.

13. A non-transitory machine readable medium storing a program for execution by at least one processing unit for monitoring a health of a software managed network (SMN) comprising a plurality of network components, the program comprising sets of instructions for:
identifying a set of one or more metrics associated with the plurality of network components;
using the set of one or more metrics to compute a first health score for the SMN by computing a normalized metric value for each metric in the set of one or more metrics, and computing the first health score based on the normalized metric values for each metric in the set of one or more metrics and weights assigned to each metric;
presenting the first health score in a user interface (UI) along with (i) data regarding how the first health score was computed, and (ii) a set of one or more parameters for a user to modify how the health for the SMN is computed; and
after receiving from the user one or more modifications to at least one parameter in the set of parameters, computing a second health score for the SMN based on the modified set of parameters.

14. The non-transitory machine readable medium of claim 13 wherein the data presented in the UI comprises the first health score and the normalized metric values.

15. The non-transitory machine readable medium of claim 14, wherein the normalized metric values are computed based on rules and thresholds defined by the user through the UI, and the data presented in the UI further comprises the rules and thresholds.

16. The non-transitory machine readable medium of claim 15, wherein:
the one or more modifications to at least one parameter comprises at least one modification to the rules and thresholds, and
the sets of instructions for computing the second health score comprises sets of instructions for:
computing an updated normalized metric value for each metric in the set of one or more metrics based on the at least one modification to the rules and thresholds;
computing the second health score based on the updated normalized metric values for each metric and the weights assigned to each metric; and
presenting the updated normalized metric values and the second health score in the UI.

17. The non-transitory machine readable medium of claim 14, wherein the data presented in the UI further comprises the weights.

18. The non-transitory machine readable medium of claim 13, wherein:
the one or more modifications to at least one parameter comprises at least one modification to at least one of the weights, and
the sets of instructions for computing the second health score comprises sets of instructions for:
computing the second health score based on the normalized metric values for each metric and updated weights, wherein the updated weights are based on the at least one modification to the weights; and
presenting the normalized metric values for each metric, the updated weights, and the second health score in the UI.

* * * * *